United States Patent
Yamamoto et al.

(10) Patent No.: US 11,258,094 B2
(45) Date of Patent: Feb. 22, 2022

(54) SOLID ELECTROLYTE, METHOD FOR PRODUCING SOLID ELECTROLYTE, SECONDARY BATTERY, AND ELECTRONIC APPARATUS

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 279 days.

(21) Appl. No.: 16/697,385

(22) Filed: Nov. 27, 2019

(65) Prior Publication Data
US 2020/0168946 A1 May 28, 2020

(30) Foreign Application Priority Data
Nov. 28, 2018 (JP) .............................. JP2018-221996

(51) Int. Cl.
*H01M 10/0562* (2010.01)
*H01M 10/058* (2010.01)
*H01M 4/38* (2006.01)
*H01M 6/18* (2006.01)
*H01M 50/10* (2021.01)
(Continued)

(52) U.S. Cl.
CPC ....... *H01M 10/0562* (2013.01); *H01M 4/382* (2013.01); *H01M 6/187* (2013.01); *H01M 10/058* (2013.01); *H01M 50/10* (2021.01); *H01M 10/0525* (2013.01); *H01M 10/0565* (2013.01)

(58) Field of Classification Search
CPC combination set(s) only.
See application file for complete search history.

(56) References Cited

U.S. PATENT DOCUMENTS

2016/0149260 A1* 5/2016 Badding ........... H01M 10/0562
429/405
2016/0308244 A1* 10/2016 Badding ............... H01M 4/382
(Continued)

FOREIGN PATENT DOCUMENTS

CN           106941190      *   7/2017
JP           2010-045019 A     2/2010

OTHER PUBLICATIONS

CN 106941190 MT (Year: 2017).*
(Continued)

*Primary Examiner* — Alexander Usyatinsky
(74) *Attorney, Agent, or Firm* — Oliff PLC

(57) ABSTRACT

A lithium battery as a secondary battery includes a positive electrode composite material containing a solid electrolyte and a positive electrode active material containing lithium, a negative electrode as an electrode provided at one face of the positive electrode composite material, and a current collector provided at another face of the positive electrode composite material, wherein the solid electrolyte is a garnet-type fluorine-containing lithium composite metal oxide that is represented by the following compositional formula (1) or (2) and that conducts lithium.

$$(Li_{7-3x}Ga_x)(La_{3-y}Nd_y)Zr_2O_{12-z}F_z \quad (1)$$

$$(Li_{7-3x+y}Ga_x)(La_{3-y}Ca_y)Zr_2O_{12-z}F_z \quad (2)$$

Provided that $0.1 \leq x \leq 1.0$, $0 < y \leq 0.2$, and $0 < z \leq 1.0$.

8 Claims, 8 Drawing Sheets

(51) Int. Cl.
*H01M 10/0565* (2010.01)
*H01M 10/0525* (2010.01)

(56) References Cited

U.S. PATENT DOCUMENTS

2018/0294520 A1* 10/2018 Takano ............. C04B 35/62615
2019/0198921 A1* 6/2019 Takano .................. C01F 17/00

OTHER PUBLICATIONS

Lu et. ACS Applied Materials & Interfaces, 2019, 2042 (Year: 2019).*
Lu et. el.Wuji Cailiao Xuebao 2015, p. 995. (Abstract) (Year: 2015).*
Zhang et. al Electrochimica Acta 289 (2018) 254-263 (Year: 2018).*

* cited by examiner

SOLID ELECTROLYTE, METHOD FOR PRODUCING SOLID ELECTROLYTE, SECONDARY BATTERY, AND ELECTRONIC APPARATUS

The present application is based on, and claims priority from JP Application Serial Number 2018-221996, filed on Nov. 28, 2018, the disclosure of which is hereby incorporated by reference herein in its entirety.

BACKGROUND

1. Technical Field

The present disclosure relates to a solid electrolyte, a method for producing a solid electrolyte, a secondary battery, and an electronic apparatus.

2. Related Art

As a solid electrolyte, for example, JP-A-2010-45019 (Patent Document 1) describes a solid electrolyte containing a ceramic having a garnet-type or garnet-like crystal structure composed of lithium (Li), lanthanum (La), zirconium (Zr), and oxygen (O).

In addition, Patent Document 1 describes as a method for producing such a solid electrolyte, a production method including preparing a raw material containing a lithium component, a lanthanum component, and a zirconium component, and obtaining a ceramic having a garnet-type or garnet-like crystal structure composed of lithium (Li), lanthanum (La), zirconium (Zr), and oxygen (O) by subjecting the raw material to a heat treatment at a temperature exceeding 1125° C. and lower than 1230° C.

However, in the method for producing a solid electrolyte of Patent Document 1, the solid electrolyte is likely to become coarse particles after the heat treatment. Therefore, a solid electrolyte pellet formed using such a solid electrolyte has a grain boundary resistance. A total lithium ion conductivity of the solid electrolyte pellet includes a bulk lithium ion conductivity and a grain boundary lithium ion conductivity, and therefore, when the grain boundary resistance is large, the total lithium ion conductivity is decreased. That is, there was a problem that the total lithium ion conductivity is desired to be further improved.

SUMMARY

A solid electrolyte according to an aspect of the present application is a garnet-type solid electrolyte that is represented by the following compositional formula (1) or (2) and that conducts lithium.

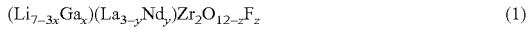

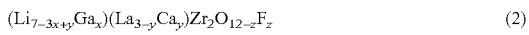

In the formulae, $0.1 \leq x \leq 1.0$, $0 < y \leq 0.2$, and $0 < z \leq 1.0$.

A method for producing a solid electrolyte according to an aspect of the present application is a method for producing a garnet-type solid electrolyte that is represented by the following compositional formula (1) or (2) and that conducts lithium, and includes forming a first mixture by mixing raw material solutions containing elements shown in the compositional formula (1) or (2), forming a calcined body by subjecting the first mixture to a first heating treatment, forming a second mixture by mixing the calcined body with lithium fluoride, and performing main firing by subjecting the second mixture to a second heating treatment, wherein a mixing amount of the lithium fluoride is an amount configured to substitute 1 atom or less of oxygen with fluorine.

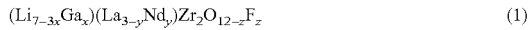

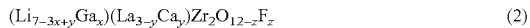

In the formulae, $0.1 \leq x \leq 1.0$, $0 < y \leq 0.2$, and $0 < z \leq 1.0$.

Another method for producing a solid electrolyte according to an aspect of the present application is a method for producing a garnet-type solid electrolyte that is represented by the following compositional formula (1) or (2) and that conducts lithium, and includes forming a mixture by mixing raw material solutions containing elements shown in the compositional formula (1) or (2) with lithium fluoride, forming a calcined body by subjecting the mixture to a first heating treatment, and performing main firing by subjecting the calcined body to a second heating treatment, wherein a mixing amount of the lithium fluoride is an amount configured to substitute 1 atom or less of oxygen with fluorine.

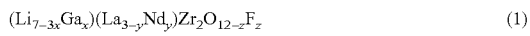

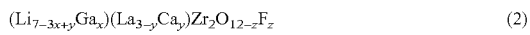

In the formulae, $0.1 \leq x \leq 1.0$, $0 < y \leq 0.2$, and $0 < z \leq 1.0$.

In the method for producing a solid electrolyte described above, a temperature in the first heating treatment may be 500° C. or higher and 650° C. or lower, and a temperature in the second heating treatment may be 800° C. or higher and 1000° C. or lower.

A secondary battery according to an aspect of the present application includes a positive electrode composite material containing the solid electrolyte described above and a positive electrode active material containing lithium, an electrode provided at one face of the positive electrode composite material, and a current collector provided at another face of the positive electrode composite material.

In the secondary battery described above, the positive electrode active material may be a lithium composite metal oxide.

In the secondary battery described above, the electrode may be metallic lithium.

An electronic apparatus according to an aspect of the present application includes the secondary battery described above.

DESCRIPTION OF EXEMPLARY EMBODIMENTS

Hereinafter, embodiments of the present disclosure will be described with reference to the drawings. In the respective drawings below, portions to be described are shown by being appropriately enlarged or reduced in size so that the portions have a recognizable size.

1. First Embodiment 1-1. Secondary Battery

Figure 1:
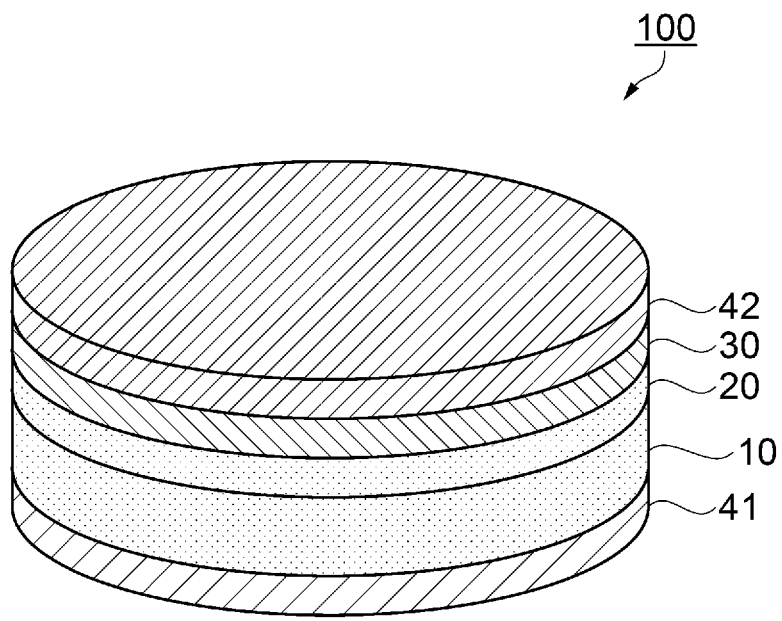
FIG. 1 is a schematic perspective view showing a configuration of a lithium battery as a secondary battery of a first embodiment.
Figure 2:
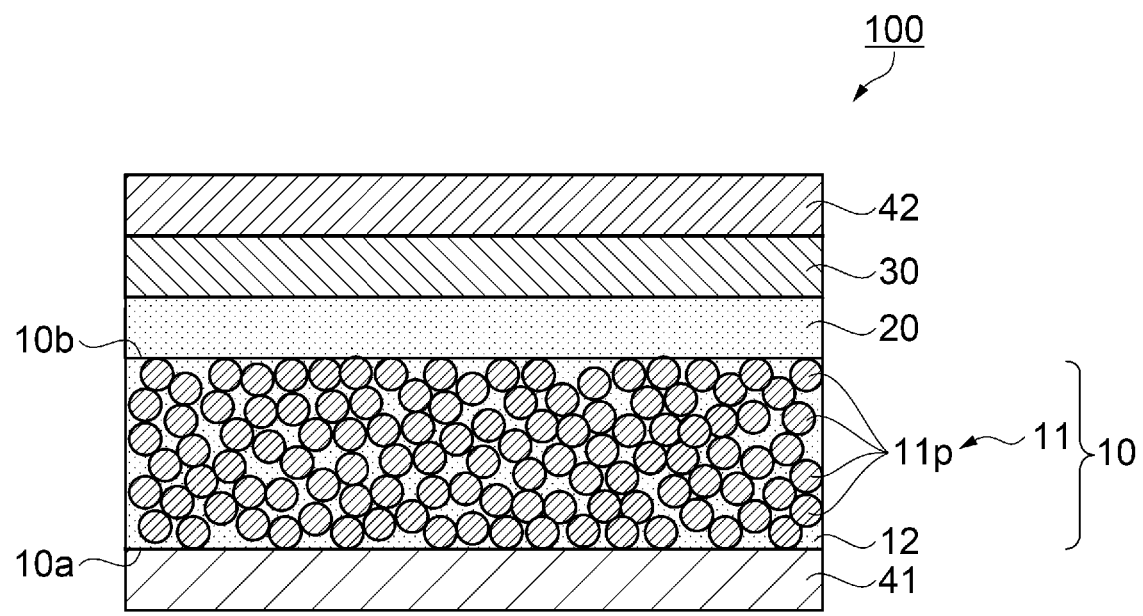
FIG. 2 is a schematic cross-sectional view showing a structure of the lithium battery as the secondary battery of the first embodiment.

First, a secondary battery using a solid electrolyte of this embodiment will be described with reference to FIGS. 1 and 2 by showing a lithium battery as an example. FIG. 1 is a schematic perspective view showing a configuration of a lithium battery as a secondary battery of a first embodiment. FIG. 2 is a schematic cross-sectional view showing a structure of the lithium battery as the secondary battery of the first embodiment.

As shown in FIG. 1, a lithium battery 100 as the secondary battery of this embodiment includes a positive electrode composite material 10 functioning as a positive electrode, and an electrolyte layer 20 and a negative electrode 30 sequentially stacked on the positive electrode composite material 10. The lithium battery further includes a current collector 41 in contact with the positive electrode composite material 10 and a current collector 42 in contact with the negative electrode 30. The positive electrode composite material 10, the electrolyte layer 20, and the negative electrode 30 are all constituted by a solid phase, and therefore, the lithium battery 100 of this embodiment is an all solid-state secondary battery that can be charged and discharged.

The lithium battery 100 of this embodiment has, for example, a circular disk shape, and the size of the outer shape thereof is such that the diameter is, for example, 10 mm and the thickness is, for example, about 0.3 mm. In addition to being small and thin, the lithium battery can be charged and discharged and is in an all solid state, and therefore can be favorably used as a power supply for a portable information terminal such as a smartphone. The size and the thickness of the lithium battery 100 are not limited to the above values as long as it can be molded. In a case where the size of the outer shape thereof is 10 mm in diameter as in this embodiment, the thickness from the positive electrode composite material 10 to the negative electrode 30 is about 0.1 mm estimated from the viewpoint of moldability when it is thin, and is up to about 1 mm estimated from the viewpoint of lithium ion conduction property when it is thick, and if it is too thick, the utilization efficiency of the active material is deteriorated. The shape of the lithium battery 100 is not limited to a circular disk shape, and may be a polygonal disk shape. Hereinafter, the respective configurations will be described in detail.

1-1-1. Positive Electrode Composite Material

As shown in FIG. 2, the positive electrode composite material 10 is configured to include an active material portion 11 that is an aggregate of particulate positive electrode active materials 11p and a solid electrolyte 12 of this embodiment. There is a void between the adjacent particulate positive electrode active materials 11p in the active material portion 11, and the solid electrolyte 12 is provided so as to fill up the void. That is, the positive electrode composite material 10 is in a state where the active material portion 11 that is an aggregate of the particulate positive electrode active materials 11p and the solid electrolyte 12 are combined.

As the positive electrode active material 11p of this embodiment, it is preferred to use a lithium composite metal oxide containing at least lithium (Li) and also containing at least one type of transition metal selected from vanadium (V), chromium (Cr), manganese (Mn), iron (Fe), cobalt (Co), nickel (Ni), and copper (Cu) as a constituent element because it is chemically stable. Examples of such a lithium composite metal oxide include $LiCoO_2$, $LiNiO_2$, $LiMn_2O_4$, $Li_2Mn_2O_3$, NMC ($Li(Ni_xMn_yCo_{1-x-y})O_2[0<x+y<1]$), NCA ($Li(Ni_xCo_yAl_{1-x-y})O_2$ $[0<x+y<1]$), $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Further, solid solutions obtained by substituting some of the atoms in a crystal of any of these lithium composite metal oxides with a typical metal, an alkali metal, an alkaline earth metal, a lanthanoid, a chalcogenide, a halogen, or the like are also included in the lithium composite metal oxide, and any of these solid solutions can also be used as the positive electrode active materials 11p. In this embodiment, $LiCoO_2$ particles are used as the positive electrode active materials 11p because a high lithium ion conductivity is obtained.

From the viewpoint that the electron conduction property is exhibited by bringing the particles of the positive electrode active materials 11p into contact with one another in the active material portion 11, as the particle diameter of the positive electrode active material 11p, for example, the average particle diameter D50 is preferably set to 500 nm or more and less than 10 μm. In FIG. 2, the shape of the particle of the positive electrode active material 11p is a spherical shape, however, the actual shape of the particle is not necessarily a spherical shape, but each particle has an indefinite shape.

As for a method for forming the active material portion 11 including the particulate positive electrode active materials 11p, the active material portion 11 may be formed into a thin film by a press sintering method or a vapor phase deposition method such as CVD, PLD, sputtering, or aerosol deposition other than a green sheet method. Further, a single crystal grown from a melt or a solution may be used. When a green sheet method or a press sintering method is used as the method for forming the active material portion 11, voids occur between the particles of the positive electrode active materials 11p after sintering. Such voids are in a state of communicating one another inside the active material portion 11. If the solid electrolyte 12 is made to exist in this void, the contact area between the particulate positive electrode active material 11p and the solid electrolyte 12 is increased, and thus, the interface impedance of the positive electrode composite material 10 can be decreased. The lithium battery 100 of this embodiment is small and thin, and therefore, in consideration of the interface impedance of the positive electrode composite material 10, the bulk density of the positive electrode active materials 11p in the active material portion 11 is preferably 40% to 60%, and the bulk density of the solid electrolyte 12 is also preferably 40% to 60%. Although the solid electrolyte 12 of this embodiment will be described in detail later, in the solid electrolyte 12, a garnet-type fluorine-containing lithium composite metal oxide conducting lithium is used, and the solid electrolyte 12 is in the form of particles having an average particle diameter smaller than that of the positive electrode active materials 11p. Therefore, an interface impedance, that is, a grain boundary resistance is also present between the solid electrolyte particles constituting the solid electrolyte 12, however, the average particle diameter is small, and thus, the grain boundary resistance becomes low so that the solid electrolyte 12 is in a state where electric charges easily move.

In the lithium battery 100, in order to obtain excellent charge-discharge characteristics, realization of a high lithium ion conductivity in the positive electrode composite material 10 is required. Therefore, it is an important issue not only as to what material is selected for the positive electrode active material 11p, but also as to what configuration of the solid electrolyte 12 is used to form the positive electrode composite material 10. In this embodiment, a garnet-type fluorine-containing lithium composite metal oxide having a high lithium ion conductivity is used as the solid electrolyte 12.

1-1-2. Solid Electrolyte

The solid electrolyte 12 of this embodiment is a garnet-type fluorine-containing lithium composite metal oxide that is represented by the following compositional formula (1) or (2) and that conducts lithium.

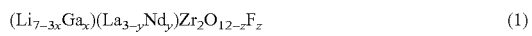

$$(Li_{7-3x}Ga_x)(La_{3-y}Nd_y)Zr_2O_{12-z}F_z \qquad (1)$$

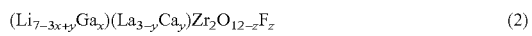

$$(Li_{7-3x+y}Ga_x)(La_{3-y}Ca_y)Zr_2O_{12-z}F_z \qquad (2)$$

In the formulae, $0.1 \leq x \leq 1.0$, $0 < y \leq 0.2$, and $0 < z \leq 1.0$.

With the use of such a garnet-type lithium composite metal oxide, by partially substituting lithium (Li) with gallium (Ga), the solid electrolyte 12 having an improved bulk lithium ion conductivity can be realized. Further, when lithium (Li) is partially substituted with gallium (Ga), coarse particles are likely to be formed after firing in a process for forming the solid electrolyte 12, however, by partially substituting lanthanum (La) with neodymium (Nd) or calcium (Ca), the formation of coarse particles is suppressed, and the grain boundary resistance is decreased. In addition, by partially substituting oxygen (O) with fluorine (F), insertion and extraction of lithium ions in the solid electrolyte 12 become smooth, and thus, the electrochemical property is improved. Further, by partially substituting oxygen (O) with fluorine (F), the oxidation state of lanthanum (La) and zirconium (Zr) that are transition metals are thermochemically stabilized.

From the viewpoint of improving the lithium ion conductivity of the solid electrolyte 12, the value x of the compositional ratio of Ga with which Li is partially substituted is preferably within a range of $0.1 \leq x \leq 1.0$. When x is less than 0.1 or x exceeds 1.0, it becomes difficult to improve the lithium ion conductivity. Further, from the viewpoint of decreasing the particle diameter of the solid electrolyte 12, the value y of the compositional ratio of Nd or Ca with which La is partially substituted is preferably within a range of $0 < y \leq 0.2$. When y exceeds 0.2, it becomes difficult to obtain an effect of decreasing the particle diameter of the solid electrolyte 12. In addition, the value z of the compositional ratio of fluorine with which oxygen is partially substituted is preferably within a range of $0 < z \leq 1.0$. That is, it is preferred to substitute 1 atom or less of oxygen with fluorine. When z exceeds 1.0, the lithium ion conduction property is deteriorated. The details will be described in the below-mentioned section of Examples and Comparative Examples of the solid electrolyte 12.

1-1-3. Negative Electrode

The negative electrode 30 as the electrode provided at one face 10b side of the positive electrode composite material 10 of this embodiment is configured to contain a negative electrode active material. Examples of the negative electrode active material include $Nb_2O_5$, $V_2O_5$, $TiO_2$, $In_2O_3$, ZnO, $SnO_2$, NiO, ITO (indium tin oxide), AZO (Al-doped zinc oxide), FTO (F-doped tin oxide), an anatase phase of $TiO_2$, lithium composite metal oxides such as $Li_4Ti_5O_{12}$ and $Li_2Ti_3O_7$, metals and alloys containing such a metal such as Li, Si, Sn, Si—Mn, Si—Co, Si—Ni, In, and Au, a carbon material, and a material obtained by intercalation of lithium ions between layers of a carbon material. The alloy is not particularly limited as long as it can occlude and release lithium, but is preferably an alloy containing any of metal or metalloid elements in groups 13 and 14 excluding carbon, more preferably a metal simple substance such as aluminum, silicon, or tin, or an alloy or a compound containing such an atom. These may be used alone or two or more types thereof may be used in any combination at any ratio. As the alloy, lithium alloys such as Li—Al, Li—Ni, Li—Si, Li—Sn, and Li—Sn—Ni, silicon alloys such as Si—Zn, tin alloys such as Sn—Mn, Sn—Co, Sn—Ni, Sn—Cu, and Sn—La, $Cu_2Sb$, $La_3Ni_2Sn_7$, and the like can be exemplified.

In consideration of the discharge capacity of the lithium battery 100 that is small and thin of this embodiment, the negative electrode 30 is preferably metallic Li or a metal simple substance forming a lithium alloy and an alloy.

As a method for forming the negative electrode 30 using the above-mentioned negative electrode active material, other than a solution process such as a so-called sol-gel method or an organometallic thermal decomposition method involving a hydrolysis reaction or the like of an organometallic compound, any method such as a CVD method using an appropriate metal compound in an appropriate gas atmosphere, an ALD method, a green sheet method or a screen printing method using a slurry of a solid negative electrode active material, an aerosol deposition method, a sputtering method using an appropriate target and an appropriate gas atmosphere, a PLD method, a vacuum vapor deposition method, a plating method, or a thermal spraying method may be used. In this embodiment, metallic Li is deposited on the electrolyte layer 20 by a sputtering method to form the negative electrode 30.

1-1-4. Electrolyte Layer

As shown in FIG. 2, the electrolyte layer 20 is provided between the positive electrode composite material 10 and the negative electrode 30. When metallic Li is used as the negative electrode 30 as described above, lithium ions are released from the negative electrode 30 during discharging of the lithium battery 100. Further, during charging of the lithium battery 100, lithium ions are deposited on the negative electrode 30 as a metal and a dendritic crystal called dendrite is formed. When the dendrite is grown and comes in contact with the positive electrode active material 11p of the positive electrode composite material 10, a short circuit occurs between the positive electrode composite material 10 functioning as a positive electrode and the negative electrode 30. In order to prevent this short circuit, the electrolyte layer 20 is provided between the positive electrode composite material 10 and the negative electrode 30. The electrolyte layer 20 is a layer composed of an electrolyte that does not include the positive electrode active material 11p. For such an electrolyte layer 20, a crystalline material or an amorphous material composed of a metal compound such as an oxide, a sulfide, a halide, a nitride, a hydride, or a boride can be used.

Example of the oxide crystalline material include $Li_{0.35}La_{0.55}TiO_3$, $Li_{0.2}La_{0.27}NbO_3$, and a perovskite-type crystal or a perovskite-like crystal in which the elements in a crystal thereof are partially substituted with N, F, Al, Sr, Sc, Nb, Ta, Sb, a lanthanoid element, or the like, $Li_7La_3Zr_2O_{12}$, $Li_5La_3Nb_2O_{12}$, $Li_5BaLa_2TaO_{12}$, and a garnet-type crystal or a garnet-like crystal in which the elements in a crystal thereof are partially substituted with N, F, Al, Sr, Sc, Nb, Ta, Sb, a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which the elements in a crystal thereof are partially substituted with N, F, Al, Sr, Sc, Nb, Ta, Sb, a lanthanoid element, or the like, a LISICON-type crystal such as $Li_{14}ZnGe_4O_{16}$, and other crystalline materials such as $Li_{3.4}V_{0.6}Si_{0.4}O_4$, $Li_{3.6}V_{0.4}Ge_{0.6}O_4$, and $Li_{2+x}C_{1-x}B_xO_3$.

Example of the sulfide crystalline material include $Li_{10}GeP_2S_{12}$, $Li_{9.6}P_3S_{12}$, $Li^{9.54}Si_{1.74}P_{1.44}S_{11.7}Cl_{0.3}$, and $Li_3PS_4$.

Examples of other amorphous materials include $Li_2O$—$TiO_2$, $La_2O_3$—$Li_2O$—$TiO_2$, $LiNbO_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_4SiO_4$—$Li_4ZrO_4$, $SiO_2$—$P_2O_5$—$Li_2O$, $SiO_2$—$P_2O_5$—$LiCl$, $Li_2O$—$LiCl$—$B_2O_3$, $LiAlCl_4$, $LiAlF_4$, $LiF$—$Al_2O_3$, $LiBr$—$Al_2O_3$, $Li_{2.88}PO_{3.73}N_{0.14}$, $Li_3N$—$LiCl$, $Li_6NBr_3$, $Li_2S$—$SiS_2$, and $Li_2S$—$SiS_2$—$P_2S_5$.

The electrolyte layer 20 may be constituted using a garnet-type lithium composite metal oxide constituting the above-mentioned solid electrolyte 12. Provided that when a crystalline material is used, the direction of lithium ion conduction is affected by a crystal plane in the crystal structure, but when an amorphous material is used, the direction of lithium ion conduction is less limited, and therefore the electrolyte layer 20 is preferably constituted using an amorphous solid electrolyte.

The thickness of the electrolyte layer 20 is preferably 0.1 μm or more and 100 μm or less, more preferably 0.2 μm or more and 10 μm or less. By setting the thickness of the electrolyte layer 20 within the above range, the internal resistance of the electrolyte layer 20 is decreased, and the occurrence of a short circuit between the positive electrode composite material 10 and the negative electrode 30 can be suppressed.

On a face in contact with the negative electrode 30 of the electrolyte layer 20, a relief structure such as a trench, a grating, or a pillar may be provided by combining various molding methods and processing methods as needed.

1-1-5. Current Collector

As shown in FIG. 2, the lithium battery 100 includes a current collector 41 in contact with another face 10a of the positive electrode composite material 10 and a current collector 42 in contact with the negative electrode 30. For the current collectors 41 and 42, for example, one type of metal (metal simple substance) selected from the metal group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy composed of two or more types of metals selected from the metal group, or the like is used.

In this embodiment, aluminum (Al) is used as the current collector 41 at the positive electrode composite material 10 side, and copper (Cu) is used as the current collector 42 at the negative electrode 30 side. The thickness of each of the current collectors 41 and 42 is, for example, 20 to 40 μm. The lithium battery 100 may not necessarily include a pair of current collectors 41 and 42 and may include one current collector of the pair of current collectors 41 and 42. For example, when a plurality of lithium batteries 100 are stacked so as to be electrically coupled to one another in series and used, a configuration in which the lithium battery 100 includes only the current collector 41 of the pair of current collectors 41 and 42 may be adopted.

1-2. Method for Producing Solid Electrolyte

Figure 3:
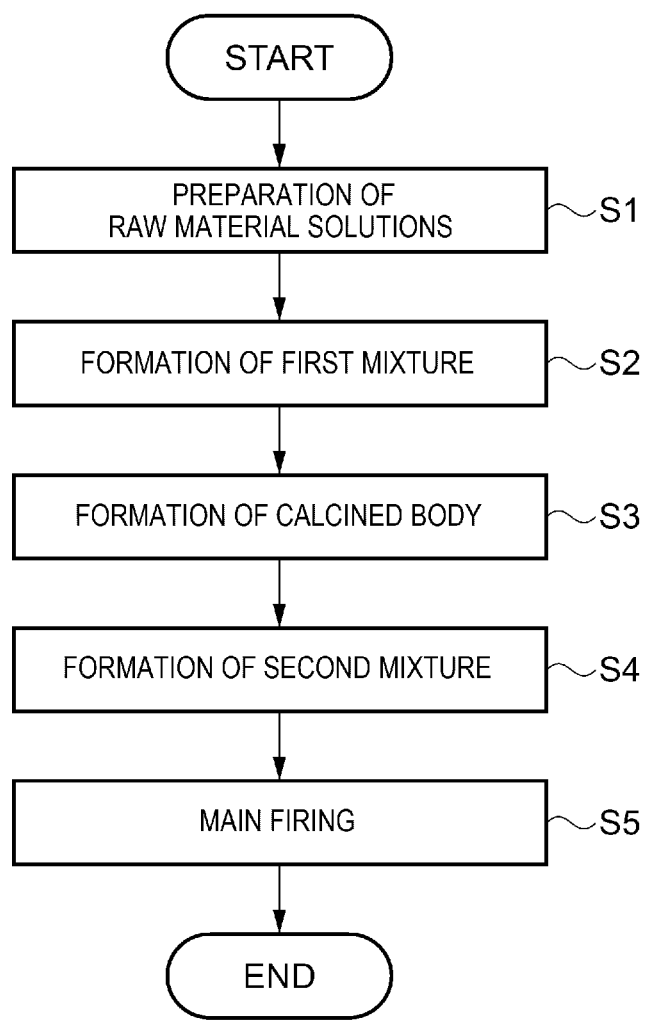
FIG. 3 is a flowchart showing a method for producing a solid electrolyte of a first embodiment.
Figure 4:
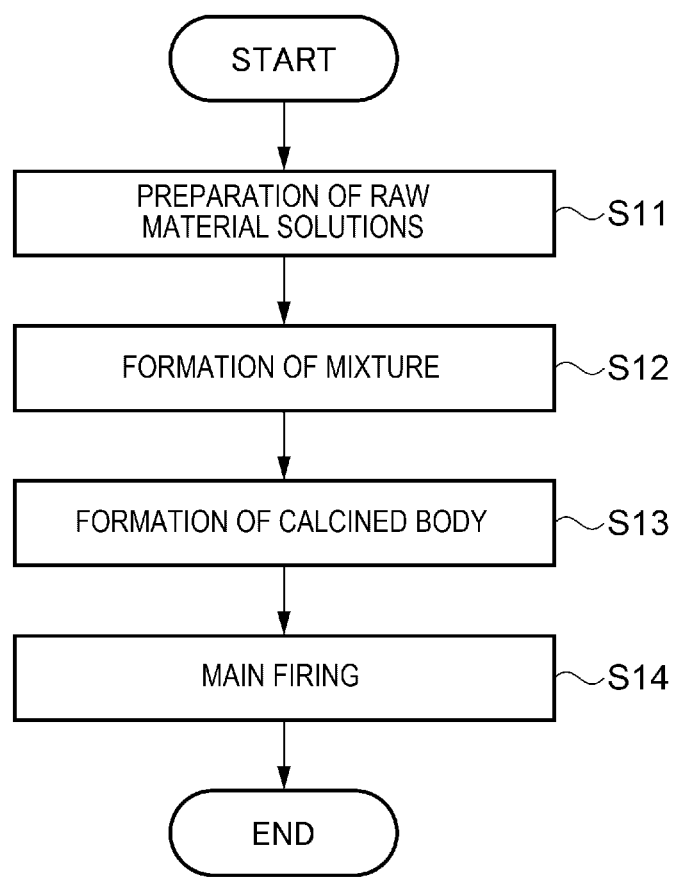
FIG. 4 is a flowchart showing another method for producing a solid electrolyte of a first embodiment.

Next, a method for producing the solid electrolyte 12 of this embodiment will be described with reference to FIGS. 3 and 4. FIG. 3 is a flowchart showing a method for producing a solid electrolyte of this embodiment. FIG. 4 is a flowchart showing another method for producing a solid electrolyte of this embodiment. In this embodiment, the method for producing the solid electrolyte 12 in two ways will be illustrated.

As shown in FIG. 3, the method for producing the solid electrolyte 12 of this embodiment includes a step of preparing raw material solutions containing elements shown in the following compositional formula (1) or (2) (Step S1), a step of forming a first mixture by mixing the raw material solutions for each element (Step S2), a step of forming a calcined body by subjecting the first mixture to a first heating treatment (Step S3), a step of forming a second mixture by mixing the calcined body with lithium fluoride (Step S4), and a step of performing main firing by subjecting the second mixture to a second heating treatment (Step S5). Further, the mixing amount of lithium fluoride in Step S4 is an amount capable of substituting 1 atom or less of oxygen with fluorine.

$$(Li_{7-3x}Ga_x)(La_{3-y}Nd_y)Zr_2O_{12-z}F_z \qquad (1)$$

$$(Li_{7-3x+y}Ga_x)(La_{3-y}Ca_y)Zr_2O_{12-z}F_z \qquad (2)$$

In the formulae, $0.1 \leq x \leq 1.0$, $0 < y \leq 0.2$, and $0 < z \leq 1.0$.

In Step S1, raw material solutions containing Li, Ga, La, Nd or Ca, and Zr that are elements included in the above compositional formula are prepared for each element. Specifically, each raw material solution is prepared so as to contain 1 mol (mole) of each element per kg of the raw material solution. The sources of the elements in the raw material solutions are a lithium compound, a gallium compound, a lanthanum compound, a neodymium compound or a calcium compound, and a zirconium compound that can be dissolved in a single solvent of water or an organic solvent or a mixed solvent thereof. These element compounds are preferably metal salts or metal alkoxides of the elements.

Examples of the lithium compound (lithium source) include lithium metal salts such as lithium chloride, lithium nitrate, lithium acetate, lithium hydroxide, and lithium carbonate, and lithium alkoxides such as lithium methoxide, lithium ethoxide, lithium propoxide, lithium isopropoxide, lithium butoxide, lithium isobutoxide, lithium sec-butoxide, lithium tert-butoxide, and lithium dipivaloylmethanate, and among these, one type can be used or two or more types can be used in combination.

Examples of the gallium compound (gallium source) include gallium metal salts such as gallium bromide, gallium chloride, gallium iodide, and gallium nitrate, and gallium alkoxides such as gallium trimethoxide, gallium triethoxide, gallium tri-n-propoxide, gallium triisopropoxide, and gallium tri-n-butoxide, and among these, one type can be used or two or more types can be used in combination.

Examples of the lanthanum compound (lanthanum source) include lanthanum metal salts such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tributoxide, lanthanum triisobutoxide, lanthanum tri-sec-butoxide, lanthanum tri-tert-butoxide, and lanthanum dipivaloylmethanate, and among these, one type can be used or two or more types can be used in combination.

Examples of the neodymium compound (neodymium source) include neodymium metal salts such as neodymium bromide, neodymium chloride, neodymium oxalate, neodymium acetate, neodymium nitrate, neodymium sulfate, neodymium trimethacrylate, neodymium triacetylacetonate, and neodymium tri-2-ethylhexanoate, and neodymium alkoxides such as neodymium triisopropoxide and neodymium trimethoxyethoxide, and among these, one type can be used or two or more types can be used in combination.

Examples of the calcium compound (calcium source) include calcium metal salts such as calcium bromide, calcium chloride, calcium iodide, calcium nitrate, calcium oxalate, and calcium acetate, and calcium alkoxides such as calcium dimethoxide, calcium diethoxide, calcium diisopropoxide, calcium di-n-propoxide, calcium diisobutoxide, calcium di-n-butoxide, and calcium di-sec-butoxide, and among these, one type can be used or two or more types can be used in combination.

Examples of the zirconium compound (zirconium source) include zirconium metal salts such as zirconium chloride, zirconium oxychloride, zirconium oxynitrate, zirconium oxyacetate, and zirconium acetate, and zirconium alkoxides such as zirconium tetramethoxide, zirconium tetraethoxide, zirconium tetrapropoxide, zirconium tetraisopropoxide, zirconium tetrabutoxide, zirconium tetraisobutoxide, zirconium tetra-sec-butoxide, zirconium tetra-tert-butoxide, and zirconium dipivaloylmethanate, and among these, one type can be used or two or more types can be used in combination.

The organic solvent constituting a single solvent or a mixed solvent is not particularly limited, however, examples thereof include alcohols such as methyl alcohol, ethyl alcohol, n-propyl alcohol, isopropyl alcohol, n-butyl alcohol, allyl alcohol, and ethylene glycol monobutyl ether (2-n-butoxyethanol), glycols such as ethylene glycol, propylene glycol, butylene glycol, hexylene glycol, pentanediol, hexanediol, heptanediol, and dipropylene glycol, ketones such as dimethyl ketone, methyl ethyl ketone, methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, 2-ethylbutyric acid, and propionic acid, aromatics such as toluene, o-xylene, and p-xylene, and amides such as formamide, N,N-dimethylformamide, N,N-diethylformamide, dimethylacetamide, and N-methylpyrrolidone.

In Step S2, according to the compositional ratio of the elements in the above compositional formula (1) or (2), five types of raw material solutions prepared in Step S1 are mixed together, whereby a mixed solution is prepared. Then, the solvent is removed by heating the mixed solution, whereby a first mixture is formed. The amount of the raw material solution of lithium in the mixed solution is increased with respect to the predetermined amount shown in the compositional formula (1) or (2) in consideration of the amount of lithium lost by volatilization in main firing to be performed thereafter.

In Step S3, the first mixture obtained in Step S2 is subjected to a first heating treatment at 500° C. or higher and 650° C. or lower so as to completely remove the solvent from the first mixture, whereby a calcined body is formed. The heating time in the calcination is 30 minutes to 2 hours.

In Step S4, the calcined body obtained in Step S3 and lithium fluoride (LiF) are mixed, whereby a second mixture is formed. Specifically, the calcined body is transferred to an agate mortar and sufficiently ground, and thereafter, lithium fluoride (LiF) in the form of a powder is added thereto and mixed together. At this time, the mixing amount of lithium fluoride (LiF) with respect to the calcined body is set to not more than an amount capable of substituting 1 atom of oxygen with fluorine.

In Step S5, main firing is performed by subjecting the second mixture obtained in Step S4 to a second heating treatment at 800° C. or higher and 1000° C. or lower. The heating time in the main firing is 4 to 10 hours. By performing the main firing, the solid electrolyte 12 that is a garnet-type crystalline material represented by the following compositional formula (1) or (2) is obtained.

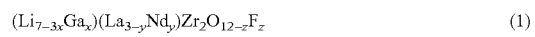

$$(Li_{7-3x}Ga_x)(La_{3-y}Nd_y)Zr_2O_{12-z}F_z \tag{1}$$

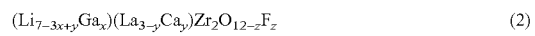

$$(Li_{7-3x+y}Ga_x)(La_{3-y}Ca_y)Zr_2O_{12-z}F_z \tag{2}$$

In the formulae, $0.1 \leq x \leq 1.0$, $0 < y \leq 0.2$, and $0 < z \leq 1.0$.

1-2-1. Another Method for Producing Solid Electrolyte

As shown in FIG. 4, another method for producing the solid electrolyte 12 of this embodiment includes a step of preparing raw material solutions containing elements shown in the following compositional formula (1) or (2) (Step S11), a step of forming a mixture by mixing the raw material solutions for each element with lithium fluoride (Step S12), a step of forming a calcined body by subjecting the mixture to a first heating treatment (Step S13), and a step of performing main firing by subjecting the calcined body to a second heating treatment (Step S14). Further, the mixing amount of lithium fluoride in Step S12 is an amount capable of substituting 1 atom or less of oxygen with fluorine.

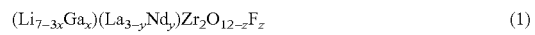

$$(Li_{7-3x}Ga_x)(La_{3-y}Nd_y)Zr_2O_{12-z}F_z \tag{1}$$

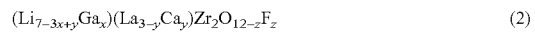

$$(Li_{7-3x+y}Ga_x)(La_{3-y}Ca_y)Zr_2O_{12-z}F_z \tag{2}$$

In the formulae, $0.1 \leq x \leq 1.0$, $0 < y \leq 0.2$, and $0 < z \leq 1.0$.

Step S11 in the another method for producing the solid electrolyte 12 of this embodiment is the same as Step S1 in the method for producing the solid electrolyte 12 described above. Therefore, a detailed description thereof will be omitted.

In Step S12, according to the compositional ratio of the elements in the above compositional formula (1) or (2), five types of raw material solutions prepared in Step S11 are mixed together, whereby a mixed solution is prepared. Then, lithium fluoride (LiF) in the form of a powder is added to the mixed solution and sufficiently mixed together. The solvent is removed by heating the mixed solution obtained by mixing with lithium fluoride (LiF), whereby a mixture is formed.

In Step S13, the mixture obtained in Step S12 is subjected to a first heating treatment at 500° C. or higher and 650° C. or lower so as to completely remove the solvent component from the mixture, whereby a calcined body is formed. The heating time in the calcination is 30 minutes to 2 hours.

In Step S14, the calcined body obtained in Step S13 is transferred to an agate mortar and sufficiently ground. The ground calcined body is subjected to a second heating treatment at 800° C. or higher and 1000° C. or lower, whereby main firing is performed. The heating time in the main firing is 4 to 10 hours. By performing the main firing, the solid electrolyte 12 that is a garnet-type crystalline material represented by the following compositional formula (1) or (2) is obtained.

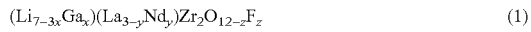
$$(Li_{7-3x}Ga_x)(La_{3-y}Nd_y)Zr_2O_{12-z}F_z \quad (1)$$

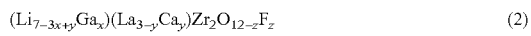
$$(Li_{7-3x+y}Ga_x)(La_{3-y}Ca_y)Zr_2O_{12-z}F_z \quad (2)$$

In the formulae, $0.1 \leq x \leq 1.0$, $0 < y \leq 0.2$, and $0 < z \leq 1.0$.

Since the temperature in the second heating treatment is 1000° C. or lower, volatilization of lithium during main firing is suppressed as compared with a case where main firing is performed at a temperature exceeding 1000° C.

According to the production method from Step S1 to Step S5 described above, lithium fluoride (LiF) in the form of a powder is mixed with the ground calcined body in Step S4, and therefore, the calcined body and lithium fluoride (LiF) can be well mixed together. That is, the second mixture obtained by well mixing the calcined body with lithium fluoride (LiF) is subjected to main firing, whereby oxygen can be partially substituted with fluorine.

On the other hand, according to the production method from Step S11 to Step S14 described above, lithium fluoride (LiF) in the form of a powder is mixed with the raw material solutions in Step S12, and therefore, although it is necessary to carefully perform the mixing so that lithium fluoride (LiF) is uniformly dispersed in the solution, but the method has an advantage that the production process can be simplified.

1-3. Method for Producing Lithium Battery

Figure 5:
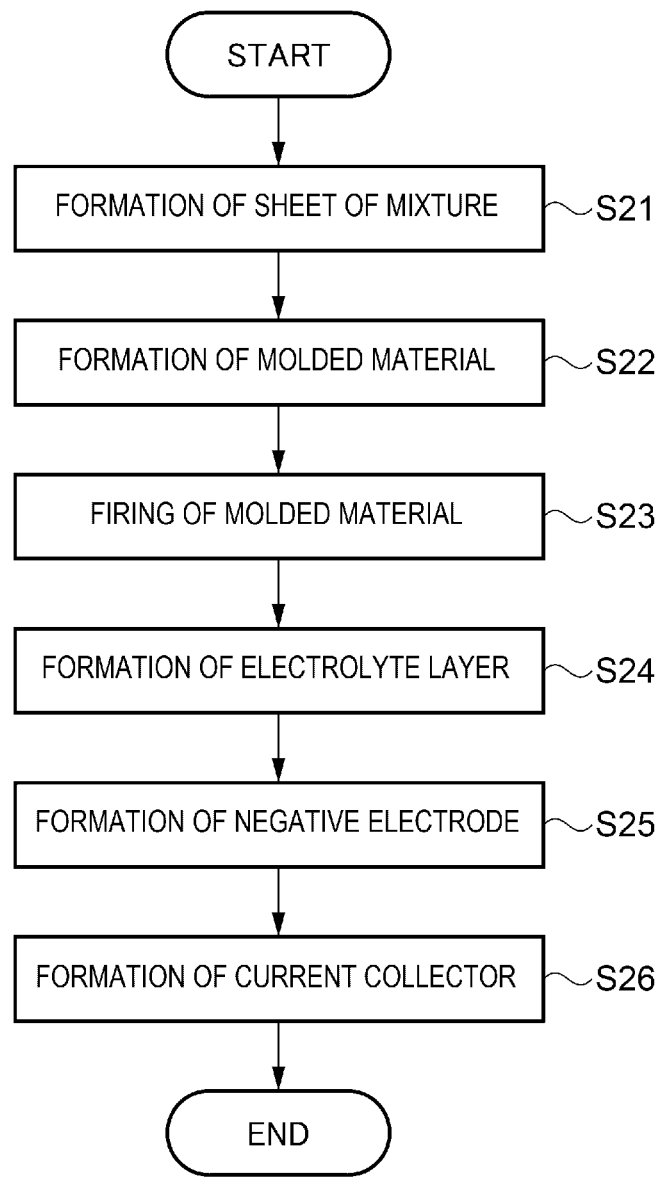
FIG. 5 is a flowchart showing a method for producing a lithium battery of a first embodiment.
Figure 6:
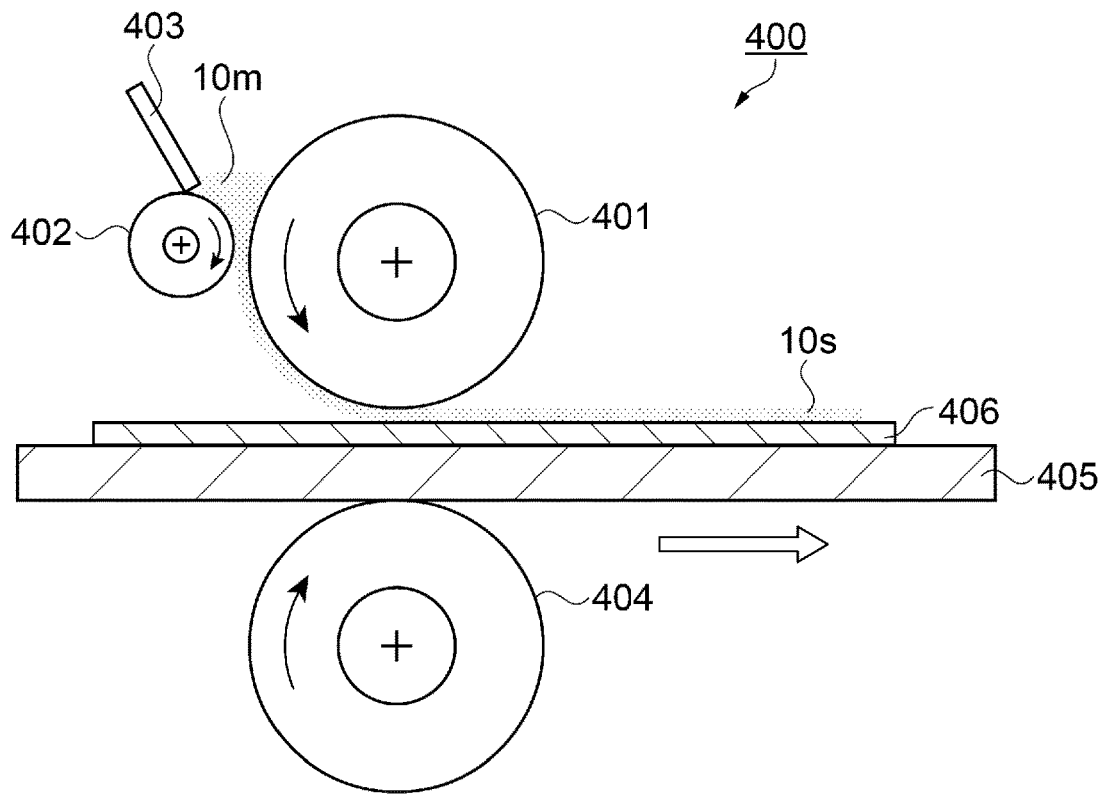
FIG. 6 is a schematic view showing a step in the method for producing a lithium battery of the first embodiment.
Figure 7:
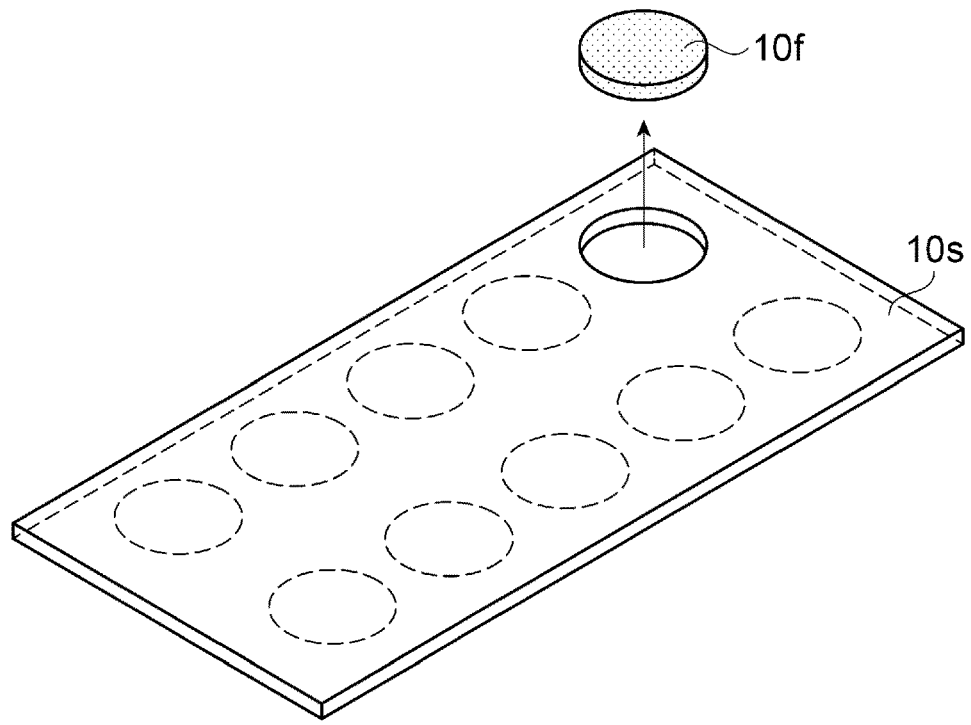
FIG. 7 is a schematic view showing a step in the method for producing a lithium battery of the first embodiment.

Next, an example of a method for producing the lithium battery 100 of this embodiment will be described with reference to FIGS. 5 to 7. FIG. 5 is a flowchart showing a method for producing a lithium battery of a first embodiment. FIGS. 6 and 7 are each a schematic view showing a step in the method for producing a lithium battery of the first embodiment.

As shown in FIG. 5, an example of the method for producing the lithium battery 100 of this embodiment includes a step of forming a sheet of a mixture containing the solid electrolyte 12 and the positive electrode active materials 11p (Step S21), a step of forming a molded material using the sheet of the mixture (Step S22), and a step of firing the molded material (Step S23). Step S21 to Step S23 so far are steps showing a method for producing the positive electrode composite material 10. Then, the method includes a step of forming the electrolyte layer 20 for the obtained positive electrode composite material 10 (Step S24), a step of forming the negative electrode 30 (Step S25), and a step of forming the current collectors 41 and 42 (Step S26).

In the step of forming a sheet of a mixture of Step S21, first, the ground solid electrolyte 12, the particulate positive electrode active materials 11p, a solvent, and a binder are mixed, whereby a slurry 10m as the mixture is prepared. The mass ratios of the respective materials in the slurry 10m are, for example, as follows: the solid electrolyte 12 at 40%, the positive electrode active materials 11p at 40%, the binder at 10%, and the remainder is the solvent. Subsequently, by using the slurry 10m, a sheet is formed. Specifically, as shown in FIG. 6, for example, by using a roll coater 400, the slurry 10m is coated to a given thickness on a base material 406 such as a film, whereby a sheet 10s is formed. The roll coater 400 includes a coating roller 401 and a doctor roller 402. A squeegee 403 is provided in contact with the doctor roller 402 from above. A conveyance roller 404 is provided below the coating roller 401 at a position opposed thereto, and by inserting a stage 405 on which the base material 406 is placed between the coating roller 401 and the conveyance roller 404, the stage 405 is conveyed in a given direction. The slurry 10m is fed to a side where the squeegee 403 is provided between the coating roller 401 and the doctor roller 402 disposed with a space in a conveyance direction of the stage 405. By rotating the coating roller 401 and the doctor roller 402 so as to extrude the slurry 10m downward from the space, the slurry 10m having a given thickness is coated on the surface of the coating roller 401. Then, by rotating the conveyance roller 404 at the same time, the stage 405 is conveyed so that the base material 406 comes into contact with the coating roller 401 on which the slurry 10m is coated. By doing this, the slurry 10m coated on the coating roller 401 is transferred in a sheet form to the base material 406, whereby the sheet 10s is formed. The thickness of the sheet 10s at this time is, for example, 175 to 225 μm. In the step of forming the sheet 10s of Step S21, the slurry 10m is pressed and extruded by the coating roller 401 and the doctor roller 402 so that the volume density of the positive electrode active materials 11p in the positive electrode composite material 10 obtained after firing becomes 50% or more, whereby the sheet 10s having a given thickness is formed.

Subsequently, by heating the base material 406 on which the sheet 10s is formed, the solvent is removed from the sheet 10s, whereby the sheet 10s is hardened. Then, the process proceeds to Step S22.

In the step of forming a molded material of Step S22, by punching the sheet 10s using a punching die made to correspond to the shape of the positive electrode composite material 10, a molded material 10f having a circular disk shape is taken out as shown in FIG. 7. A plurality of molded materials 10f can be taken out from one sheet 10s. Then, the process proceeds to Step S23.

In the step of firing the molded material of Step S23, the molded material 10f is placed in, for example, an electric muffle furnace, and firing is performed at a temperature lower than the melting point of the positive electrode active material 11p, whereby the molded material 10f is sintered. By the firing, the binder is removed, and also the positive electrode composite material 10 including the active material portion 11 sintered in a state where the positive electrode active materials 11p are in contact with one another is obtained. The active material portion 11 is in a state where the solid electrolyte 12 is present in voids between the adjacent particulate positive electrode active materials 11p therein (see FIG. 2). The thickness of the positive electrode composite material 10 obtained after firing is about 150 to 200 μm. Then, the process proceeds to Step S24.

In the step of forming an electrolyte layer of Step S24, the electrolyte layer 20 is formed for the positive electrode composite material 10. In this embodiment, for example, LIPON ($Li_{2.9}PO_{3.3}N_{0.46}$) that is an amorphous electrolyte is deposited by a sputtering method, whereby the electrolyte layer 20 is formed. The thickness of the electrolyte layer 20 is, for example, 2 μm. Then, the process proceeds to Step S25.

In the step of forming a negative electrode of Step S25, the negative electrode 30 is formed by being stacked on the electrolyte layer 20. As a method for forming the negative electrode 30, as described above, various methods such as a solution process can be used, however, in this embodiment, metallic Li is deposited for the electrolyte layer 20 by a sputtering method, whereby the negative electrode 30 is formed. The thickness of the negative electrode 30 is, for example, 20 μm. Then, the process proceeds to Step S26.

In the step of forming a current collector of Step S26, as shown in FIG. 2, the current collector 41 is formed in contact with the another face 10a of the positive electrode composite material 10. Further, the current collector 42 is formed in contact with the negative electrode 30. In this embodiment, for example, an aluminum foil having a thickness of 20 μm is used, and the aluminum foil is disposed in pressure-contact with a forming face, whereby the current collector 41 is formed. In addition, for example, a copper foil having a thickness of 20 μm is used, and the copper foil is disposed in pressure-contact with a forming face, whereby the current collector 42 is formed. By doing this, the lithium battery 100 in which a stacked body obtained by sequentially stacking the positive electrode composite material 10, the electrolyte layer 20, and the negative electrode 30 is sandwiched between the pair of current collectors 41 and 42 is obtained. The current collector 41 maybe formed in contact with the positive electrode composite material 10 after Step S23.

1-4. Examples and Comparative Examples of Solid Electrolyte

Next, with respect to the solid electrolyte of this embodiment, specific Examples 1 to 4 and Comparative Examples 1 to 3 will be given, and the evaluation results thereof will be described.

First, raw material solutions containing elements of raw materials to be used in the production of solid electrolytes of Examples 1 to 4 and Comparative Examples 1 to 3 will be illustrated.

2-Butoxyethanol Solution of 1 mol/kg Lithium Nitrate

In a 30-g reagent bottle made of Pyrex (trademark of Corning Incorporated) equipped with a magnetic stirrer bar, 1.3789 g of lithium nitrate with a purity of 99.95% (manufactured by Kanto Chemical Co., Inc., 3N5) and 18.6211 g of 2-butoxyethanol (ethylene glycol monobutyl ether) (manufactured by Kanto Chemical Co., Inc., Cica Special Grade) were weighed. Then, the bottle was placed on a magnetic stirrer with a hot plate function, and lithium nitrate was completely dissolved in 2-butoxyethanol while stirring at 190° C. for 1 hour. The resulting solution was gradually cooled to room temperature of about 20° C., whereby a 2-butoxyethanol solution of 1 mol/kg lithium nitrate was obtained. The purity of lithium nitrate can be measured using an ion chromatography-mass spectrometer.

Ethyl Alcohol Solution of 1 mol/kg Gallium Nitrate n-Hydrate

In a 20-g reagent bottle made of Pyrex equipped with a magnetic stirrer bar, 3.5470 g of gallium nitrate n-hydrate (n=5.5, manufactured by Kojundo Chemical Laboratory Co., Ltd., 3N) and 6.4530 g of ethyl alcohol were weighed. Then, the bottle was placed on a magnetic stirrer with a hot plate function, and gallium nitrate n-hydrate (n=5.5) was completely dissolved in ethyl alcohol while stirring at 90° C. for 1 hour. The resulting solution was gradually cooled to room temperature of about 20° C., whereby an ethyl alcohol solution of 1 mol/kg gallium nitrate n-hydrate (n=5.5) was obtained. The hydration number n of the used gallium nitrate n-hydrate was 5.5 from the result of mass loss by a combustion experiment (differential thermal analysis).

2-Butoxyethanol Solution of 1 mol/kg Lanthanum Nitrate Hexahydrate

In a 30-g reagent bottle made of Pyrex equipped with a magnetic stirrer bar, 8.6608 g of lanthanum nitrate hexahydrate (manufactured by Kanto Chemical Co., Inc., 4N) and 11.3392 g of 2-butoxyethanol were weighed. Then, the bottle was placed on a magnetic stirrer with a hot plate function, and lanthanum nitrate hexahydrate was completely dissolved in 2-butoxyethanol while stirring at 140° C. for 30 minutes. The resulting solution was gradually cooled to room temperature of about 20° C., whereby a 2-butoxyethanol solution of 1 mol/kg lanthanum nitrate hexahydrate was obtained.

2-Butoxyethanol Solution of 1 mol/kg Neodymium Nitrate Hydrate

In a 20-g reagent bottle made of Pyrex equipped with a magnetic stirrer bar, 4.2034 g of neodymium nitrate hydrate (n=5, manufactured by Kojundo Chemical Laboratory Co., Ltd., 4N) and 5.7966 g of 2-butoxyethanol were weighed. Then, the bottle was placed on a magnetic stirrer with a hot plate function, and neodymium nitrate hydrate (n=5) was completely dissolved in 2-butoxyethanol while stirring at 140° C. for 30 minutes. The resulting solution was gradually cooled to room temperature of about 20° C., whereby a 2-butoxyethanol solution of 1 mol/kg neodymium nitrate hydrate (n=5) was obtained. The hydration number n of the used neodymium nitrate hydrate was 5 from the result of mass loss by a combustion experiment (differential thermal analysis).

2-n-Butoxyethanol Solution of 1 mol/kg Calcium Nitrate Tetrahydrate

Ina 20-g reagent bottle made of Pyrex equipped with a magnetic stirrer bar, 2.3600 g of calcium nitrate tetrahydrate (manufactured by Kanto Chemical Co., Inc., 3N) and 7.6400 g of 2-n-butoxyethanol were weighed. Then, the bottle was placed on a magnetic stirrer with a hot plate function, and calcium nitrate tetrahydrate was completely dissolved in 2-n-butoxyethanol while stirring at 100° C. for 30 minutes. The resulting solution was gradually cooled to room temperature of about 20° C., whereby a 2-n-butoxyethanol solution of 1 mol/kg calcium nitrate tetrahydrate was obtained.

Butanol Solution of 1 mol/kg Zirconium Tetra-n-Butoxide

In a 20-g reagent bottle made of Pyrex equipped with a magnetic stirrer bar, 3.8368 g of zirconium tetra-n-butoxide (manufactured by Wako Pure Chemical Industries, Ltd.) and 6.1632 g of butanol (n-butanol) were weighed. Then, the bottle was placed on a magnetic stirrer, and zirconium tetra-n-butoxide was completely dissolved in butanol while stirring at room temperature of about 20° C. for 30 minutes, whereby a butanol solution of 1 mol/kg zirconium tetra-n-butoxide was obtained.

1-4-1. Production of Solid Electrolyte Pellet for Evaluation of Example 1

In Example 1, a mixed solution was prepared using the above-mentioned raw material solutions so that the value of x becomes 0.5 and the value of y becomes 0.04 in the compositional formula $(Li_{7-3x}Ga_x)(La_{3-y}Nd_y)Zr_2O_{12}$. Specifically, first, in a reagent bottle made of Pyrex equipped with a magnetic stirrer bar, 6.150 g of the 2-butoxyethanol solution of 1 mol/kg lithium nitrate, 0.500 g of the ethanol solution of 1 mol/kg gallium nitrate n-hydrate, 2.960 g of the 2-butoxyethanol solution of 1 mol/kg lanthanum nitrate hexahydrate, 0.040 g of the 2-butoxyethanol solution of 1 mol/kg neodymium nitrate hydrate, and 2.000 g of the butanol solution of 1 mol/kg zirconium tetra-n-butoxide were weighed, and stirring was performed at room temperature for 30 minutes using a magnetic stirrer, whereby a mixed solution was obtained. The mass (g) of the 2-butoxyethanol solution of 1 mol/kg lithium nitrate is set in consideration of the amount of lithium fluoride (LiF) to be added thereafter and the mass of Li to be volatilized during main firing at 1000° C. Specifically, the mass of the 2-butoxyethanol solution of 1 mol/kg lithium nitrate is set to 6.150 g being a value obtained by subtracting 1.000 g that is the mass of Li of lithium fluoride (LiF) to be added thereafter from 7.150 g so that the mass becomes 7.150 g that is 1.3 times the mass corresponding to $Li_{5.5}$ shown in the above compositional formula when x=0.5 at a stage before main firing. The increment ratio of the lithium source when considering the mass of Li to be volatilized during main firing is not limited to 1.3 times and depends on the firing temperature. For example, when the temperature in the second heating treatment during main firing is set to 900° C., the increment ratio of the lithium source may be 1.2 times. Further, the volatilization amount of Li during main firing is saturated when the firing time exceeds 1 hour.

Subsequently, the reagent bottle was placed on a hot plate, and the set temperature of the hot plate was gradually increased to 360° C., and heating was performed at 360° C. for 30 minutes to remove the solvent from the mixed solution, whereby a first mixture was obtained. Thereafter, heating was performed for 1 hour by setting the set temperature of the hot plate to 540° C. to burn and decompose the remaining organic components, followed by gradually cooling to room temperature on the hot plate, whereby a calcined body was obtained. Subsequently, the calcined body was transferred to an agate mortar and sufficiently ground. To 200 mg (milligrams) of the ground calcined body, 6 mg of lithium fluoride (LiF) manufactured by Kojundo Chemical Laboratory Co., Ltd. was added and well mixed together, whereby a second mixture was obtained. The second mixture was placed in a die (molding die) with an exhaust port having an inner diameter of 10 mm and pressed at a pressure of 624 MPa (megapascals) for 5 minutes, whereby a second mixture pellet was prepared. Subsequently, the second mixture pellet was placed in a crucible made of magnesium oxide, and the crucible was covered with a lid made of magnesium oxide, and main firing was performed at 1000° C. for 8 hours in an electric muffle furnace. The electric muffle furnace was gradually cooled to room temperature and the second mixture pellet was taken out, whereby a solid electrolyte pellet for evaluation of Example 1 having a diameter of about 9.5 mm and a thickness of about 800 μm was produced. The method for preparing the mixed solution and producing the solid electrolyte pellet for evaluation of Example 1 is in accordance with Step S1 to Step S5 described above. 6 mg that is the amount of lithium fluoride (LiF) added with respect to 200 mg of the calcined body is an amount capable of substituting 1 atom of oxygen with fluorine. Specifically, the compositional formula representing the calcined body of Example 1 is $(Li_{5.5}Ga_{0.5})(La_{2.96}Nd_{0.04})Zr_2O_{12}$. The molecular weight of the calcined body represented by the compositional formula is 865. In that case, 200 mg of the calcined body corresponds to 0.231 mmol. The molecular weight of lithium fluoride (LiF) is 26, and the mass of lithium fluoride (LiF), at which 1 atom of oxygen is substituted with fluorine, with respect to 0.231 mmol of the calcined body is also 0.231 mmol, and therefore becomes 26×0.231 mmol≅6 mg. Accordingly, the compositional formula representing the solid electrolyte of Example 1 obtained after main firing is $(Li_{5.5}Ga_{0.5})(La_{2.96}Nd_{0.04})Zr_2O_{11}F_1$.

1-4-2. Production of Solid Electrolyte Pellet for Evaluation of Example 2

In Example 2, a mixed solution was prepared using the above-mentioned raw material solutions so that the value of x becomes 0.5 and the value of y becomes 0.04 in the compositional formula $(Li_{7-3x}Ga_x)(La_{3-y}Nd_y)Zr_2O_{12}$ in the same manner as in Example 1. Specifically, in a reagent bottle made of Pyrex equipped with a magnetic stirrer bar, 6.150 g of the 2-butoxyethanol solution of 1 mol/kg lithium nitrate, 0.500 g of the ethanol solution of 1 mol/kg gallium nitrate n-hydrate, 2.960 g of the 2-butoxyethanol solution of 1 mol/kg lanthanum nitrate hexahydrate, 0.040 g of the 2-butoxyethanol solution of 1 mol/kg neodymium nitrate hydrate, 2.000 g of the butanol solution of 1 mol/kg zirconium tetra-n-butoxide, and 0.026 g (corresponding to 1 mol/kg) of lithium fluoride (LiF) manufactured by Kojundo Chemical Laboratory Co., Ltd. were weighed, and stirring was performed at room temperature for 30 minutes using a magnetic stirrer, whereby a mixed solution was obtained. The mass (g) of the 2-butoxyethanol solution of 1 mol/kg lithium nitrate is set in consideration of the mass of Li to be volatilized during main firing to be performed thereafter in the same manner as in Example 1. The amount of lithium fluoride (LiF) in the mixed solution is an amount capable of substituting 1 atom of oxygen with fluorine by the subsequent main firing.

Subsequently, the reagent bottle was placed on a hot plate, and the set temperature of the hot plate was gradually increased to 360° C., and heating was performed at 360° C. for 30 minutes to remove the solvent from the mixed solution, whereby a mixture was obtained. Thereafter, heating was performed for 1 hour by setting the set temperature of the hot plate to 540° C. to burn and decompose the remaining organic components, followed by gradually cooling to room temperature on the hot plate, whereby a calcined body was obtained. Subsequently, the calcined body was transferred to an agate mortar and sufficiently ground. The ground calcined body was weighed to 200 mg and placed in a die (molding die) with an exhaust port having an inner diameter of 10 mm and pressed at a pressure of 624 MPa for 5 minutes, whereby a calcined body pellet was prepared. Subsequently, the calcined body pellet was placed in a crucible made of magnesium oxide, and the crucible was covered with a lid made of magnesium oxide, and main firing was performed at 1000° C. for 8 hours in an electric muffle furnace. The electric muffle furnace was gradually cooled to room temperature and the calcined body pellet subjected to main firing was taken out, whereby a solid electrolyte pellet for evaluation of Example 2 having a diameter of about 9.5 mm and a thickness of about 800 μm was produced. The method for preparing the mixed solution and producing the solid electrolyte pellet for evaluation of Example 2 is in accordance with Step S11 to Step S14 described above. Therefore, the compositional formula representing the solid electrolyte of Example 2 obtained after main firing is $(Li_{5.5}Ga_{0.5})(La_{2.96}Nd_{0.04})Zr_2O_{11}F_1$ being the same as that of Example 1.

1-4-3. Production of Solid Electrolyte Pellet for Evaluation of Example 3

In Example 3, a mixed solution was prepared using the above-mentioned raw material solutions so that the value of x becomes 0.5 and the value of y becomes 0.05 in the compositional formula $(Li_{7-3x+y}Ga_x)(La_{3-y}Ca_y)Zr_2O_{12}$. Specifically, in a reagent bottle made of Pyrex equipped with a magnetic stirrer bar, 6.215 g of the 2-butoxyethanol solution of 1 mol/kg lithium nitrate, 0.500 g of the ethanol solution of 1 mol/kg gallium nitrate n-hydrate, 2.960 g of the 2-butoxyethanol solution of 1 mol/kg lanthanum nitrate hexahydrate, 0.040 g of the 2-butoxyethanol solution of 1 mol/kg neodymium nitrate hydrate, and 2.000 g of the butanol solution of 1 mol/kg zirconium tetra-n-butoxide were weighed, and stirring was performed at room temperature for 30 minutes using a magnetic stirrer, whereby a mixed solution was obtained. The mass (g) of the 2-butoxyethanol solution of 1 mol/kg lithium nitrate is set in consideration of the mass of Li to be volatilized during main firing to be performed thereafter. Specifically, the mass of the 2-butoxyethanol solution of 1 mol/kg lithium nitrate is set to 6.215 g being a value obtained by subtracting 1.000 g that is the mass of Li of lithium fluoride (LiF) to be added thereafter from 7.215 g so that the mass becomes 7.215 g that is 1.3 times the mass corresponding to $Li_{5.55}$ shown in the above compositional formula when x=0.5 and y=0.05 at a stage before main firing.

Subsequently, the reagent bottle was placed on a hot plate, and the set temperature of the hot plate was gradually increased to 360° C., and heating was performed at 360° C. for 30 minutes to remove the solvent from the mixed solution, whereby a first mixture was obtained. Thereafter, heating was performed for 1 hour by setting the set temperature of the hot plate to 540° C. to burn and decompose the remaining organic components, followed by gradually cooling to room temperature on the hot plate, whereby a calcined body was obtained. Subsequently, the calcined body was transferred to an agate mortar and sufficiently ground. To 200 mg of the ground calcined body, 6 mg of lithium fluoride (LiF) manufactured by Kojundo Chemical Laboratory Co., Ltd. was added and well mixed together, whereby a second mixture was obtained. The second mixture was placed in a die (molding die) with an exhaust port having an inner diameter of 10 mm and pressed at a pressure of 624 MPa for 5 minutes, whereby a second mixture pellet was prepared. Subsequently, the second mixture pellet was placed in a crucible made of magnesium oxide, and the crucible was covered with a lid made of magnesium oxide, and main firing was performed at 1000° C. for 8 hours in an electric muffle furnace. The electric muffle furnace was gradually cooled to room temperature and the second mixture pellet was taken out, whereby a solid electrolyte pellet for evaluation of Example 3 having a diameter of about 9.5 mm and a thickness of about 800 μm was produced. The method for preparing the mixed solution and producing the solid electrolyte pellet for evaluation of Example 3 is a method in which Nd is replaced with Ca with respect to Example 1 and is in accordance with Step S1 to Step S5 described above. 6 mg that is the amount of lithium fluoride (LiF) added with respect to 200 mg of the calcined body is an amount capable of substituting 1 atom of oxygen with fluorine. Specifically, the compositional formula representing the calcined body of Example 3 is $(Li_{5.55}Ga_{0.5})(La_{2.95}Ca_{0.05})Zr_2O_{12}$. The molecular weight of the calcined body represented by the compositional formula is 860. In that case, 200 mg of the calcined body corresponds to 0.233 mmol. The molecular weight of lithium fluoride (LiF) is 26, and the mass of lithium fluoride (LiF), at which 1 atom of oxygen is substituted with fluorine, with respect to 0.233 mmol of the calcined body is also 0.233 mmol, and therefore becomes 26×0.233 mmol≅6 mg. Accordingly, the compositional formula representing the solid electrolyte of Example 3 obtained after main firing is $(Li_{5.55}Ga_{0.5})(La_{2.95}Ca_{0.05})Zr_2O_{11}F_1$.

1-4-4. Production of Solid Electrolyte Pellet for Evaluation of Example 4

In Example 4, a mixed solution was prepared using the above-mentioned raw material solutions so that the value of x becomes 0.5 and the value of y becomes 0.05 in the compositional formula $(Li_{7-3x+y}Ga_x)(La_{3-y}Ca_y)Zr_2O_{12}$. Specifically, in a reagent bottle made of Pyrex equipped with a magnetic stirrer bar, 6.215 g of the 2-butoxyethanol solution of 1 mol/kg lithium nitrate, 0.500 g of the ethanol solution of 1 mol/kg gallium nitrate n-hydrate, 2.960 g of the 2-butoxyethanol solution of 1 mol/kg lanthanum nitrate hexahydrate, 0.040 g of the 2-butoxyethanol solution of 1 mol/kg neodymium nitrate hydrate, 2.000 g of the butanol solution of 1 mol/kg zirconium tetra-n-butoxide, and 0.026 g (corresponding to 1 mol/kg) of lithium fluoride (LiF) manufactured by Kojundo Chemical Laboratory Co., Ltd. were weighed, and stirring was performed at room temperature for 30 minutes using a magnetic stirrer, whereby a mixed solution was obtained. The mass (g) of the 2-butoxyethanol solution of 1 mol/kg lithium nitrate is set in consideration of the mass of Li to be volatilized during main firing to be performed thereafter in the same manner as in Example 3. The amount of lithium fluoride (LiF) in the mixed solution is an amount capable of substituting 1 atom of oxygen with fluorine by the subsequent main firing.

Subsequently, the reagent bottle was placed on a hot plate, and the set temperature of the hot plate was gradually increased to 360° C., and heating was performed at 360° C. for 30 minutes to remove the solvent from the mixed solution, whereby a mixture was obtained. Thereafter, heating was performed for 1 hour by setting the set temperature of the hot plate to 540° C. to burn and decompose the remaining organic components, followed by gradually cooling to room temperature on the hot plate, whereby a calcined body was obtained. Subsequently, the calcined body was transferred to an agate mortar and sufficiently ground. The ground calcined body was weighed to 200 mg and placed in a die (molding die) with an exhaust port having an inner diameter of 10 mm and pressed at a pressure of 624 MPa for 5 minutes, whereby a calcined body pellet was prepared. Subsequently, the calcined body pellet was placed in a crucible made of magnesium oxide, and the crucible was covered with a lid made of magnesium oxide, and main firing was performed at 1000° C. for 8 hours in an electric muffle furnace. The electric muffle furnace was gradually cooled to room temperature and the calcined body pellet subjected to main firing was taken out, whereby a solid electrolyte pellet for evaluation of Example 4 having a diameter of about 9.5 mm and a thickness of about 800 μm was produced. The method for preparing the mixed solution and producing the solid electrolyte pellet for evaluation of Example 4 is a method in which Nd is replaced with Ca with respect to Example 2 and is in accordance with Step S11 to Step S14 described above. Therefore, the compositional formula representing the solid electrolyte of Example 4 obtained after main firing is $(Li_{5.55}Ga_{0.5})(La_{2.95}Ca_{0.05})Zr_2O_{11}F_1$ being the same as that of Example 3.

1-4-5. Production of Solid Electrolyte Pellet for Evaluation of Comparative Example 1

In Comparative Example 1, a mixed solution was prepared using the above-mentioned raw material solutions so that the value of x becomes 0.5 and the value of y becomes 0.04 in the compositional formula $(Li_{7-3x}Ga_x)(La_{3-y}Nd_y)Zr_2O_{12}$. Specifically, in a reagent bottle made of Pyrex equipped with a magnetic stirrer bar, 7.150 g of the 2-butoxyethanol solution of 1 mol/kg lithium nitrate, 0.500 g of the ethanol solution of 1 mol/kg gallium nitrate n-hydrate, 2.960 g of the 2-butoxyethanol solution of 1 mol/kg lanthanum nitrate hexahydrate, 0.040 g of the 2-butoxyethanol solution of 1 mol/kg neodymium nitrate hydrate, and 2.000 g of the butanol solution of 1 mol/kg zirconium tetra-n-butoxide were weighed, and stirring was performed at room temperature for 30 minutes using a magnetic stirrer, whereby a mixed solution was obtained. The mass (g) of the 2-butoxyethanol solution of 1 mol/kg lithium nitrate is set to 7.150 g that is 1.3 times the mass corresponding to $Li_{5.5}$ shown in the above compositional formula when x=0.5 in consideration of the mass of Li to be volatilized during main firing.

Subsequently, the reagent bottle was placed on a hot plate, and the set temperature of the hot plate was gradually increased to 360° C., and heating was performed at 360° C. for 30 minutes to remove the solvent from the mixed solution, whereby a mixture was obtained. Thereafter, heating was performed for 1 hour by setting the set temperature of the hot plate to 540° C. to burn and decompose the remaining organic components, followed by gradually cooling to room temperature on the hot plate, whereby a calcined body was obtained. Subsequently, the calcined body was transferred to an agate mortar and sufficiently ground. The ground calcined body was weighed to 200 mg and placed in a die (molding die) with an exhaust port having an inner diameter of 10 mm and pressed at a pressure of 624 MPa for 5 minutes, whereby a calcined body pellet was prepared. Subsequently, the calcined body pellet was placed in a crucible made of magnesium oxide, and the crucible was covered with a lid made of magnesium oxide, and main firing was performed at 1000° C. for 8 hours in an electric muffle furnace. The electric muffle furnace was gradually cooled to room temperature and the calcined body pellet subjected to main firing was taken out, whereby a solid electrolyte pellet for evaluation of Comparative Example 1 having a diameter of about 9.5 mm and a thickness of about 800 µm was produced. In the method for preparing the mixed solution and producing the solid electrolyte pellet for evaluation of Comparative Example 1, lithium fluoride (LiF) is not contained in the mixed solution with respect to Example 2. Therefore, the compositional formula representing the solid electrolyte of Comparative Example 1 obtained after main firing is $(Li_{5.5}Ga_{0.5})(La_{2.96}Nd_{0.04})Zr_2O_{12}$.

1-4-6. Production of Solid Electrolyte Pellet for Evaluation of Comparative Example 2

In Comparative Example 2, a mixed solution was prepared using the above-mentioned raw material solutions so that the value of x becomes 0.5 and the value of y becomes 0.04 in the compositional formula $(Li_{7-3x}Ga_x)(La_{3-y}Nd_y)Zr_2O_{12}$. Specifically, first, in a reagent bottle made of Pyrex equipped with a magnetic stirrer bar, 2.150 g of the 2-butoxyethanol solution of 1 mol/kg lithium nitrate, 0.500 g of the ethanol solution of 1 mol/kg gallium nitrate n-hydrate, 2.960 g of the 2-butoxyethanol solution of 1 mol/kg lanthanum nitrate hexahydrate, 0.040 g of the 2-butoxyethanol solution of 1 mol/kg neodymium nitrate hydrate, and 2.000 g of the butanol solution of 1 mol/kg zirconium tetra-n-butoxide were weighed, and stirring was performed at room temperature for 30 minutes using a magnetic stirrer, whereby a mixed solution was obtained. The mass (g) of the 2-butoxyethanol solution of 1 mol/kg lithium nitrate is set in consideration of the amount of lithium fluoride (LiF) to be added thereafter and the mass of Li to be volatilized during main firing. Specifically, the mass of the 2-butoxyethanol solution of 1 mol/kg lithium nitrate is set to 2.150 g being a value obtained by subtracting 5.000 g that is the mass of Li of lithium fluoride (LiF) to be added thereafter from 7.150 g so that the mass becomes 7.150 g that is 1.3 times the mass corresponding to $Li_{5.5}$ shown in the above compositional formula when x=0.5 at a stage before main firing.

Subsequently, the reagent bottle was placed on a hot plate, and the set temperature of the hot plate was gradually increased to 360° C., and heating was performed at 360° C. for 30 minutes to remove the solvent from the mixed solution, whereby a first mixture was obtained. Thereafter, heating was performed for 1 hour by setting the set temperature of the hot plate to 540° C. to burn and decompose the remaining organic components, followed by gradually cooling to room temperature on the hot plate, whereby a calcined body was obtained. Subsequently, the calcined body was transferred to an agate mortar and sufficiently ground. To 200 mg of the ground calcined body, 30 mg of lithium fluoride (LiF) manufactured by Kojundo Chemical Laboratory Co., Ltd. was added and well mixed together, whereby a second mixture was obtained. The second mixture was placed in a die (molding die) with an exhaust port having an inner diameter of 10 mm and pressed at a pressure of 624 MPa for 5 minutes, whereby a second mixture pellet was prepared. Subsequently, the second mixture pellet was placed in a crucible made of magnesium oxide, and the crucible was covered with a lid made of magnesium oxide, and main firing was performed at 1000° C. for 8 hours in an electric muffle furnace. The electric muffle furnace was gradually cooled to room temperature and the second mixture pellet was taken out, whereby a solid electrolyte pellet for evaluation of Comparative Example 2 having a diameter of about 9.5 mm and a thickness of about 800 µm was produced. In the method for preparing the mixed solution and producing the solid electrolyte pellet for evaluation of Comparative Example 2, the amount of lithium fluoride (LiF) to be added to 200 mg of the calcined body is an amount capable of substituting 5 atoms of oxygen with fluorine with respect to Example 1. Specifically, the compositional formula representing the calcined body of Comparative Example 2 is $(Li_{5.5}Ga_{0.5})(La_{2.96}Nd_{0.04})Zr_2O_{12}$. The molecular weight of the calcined body represented by the compositional formula is 865. In that case, 200 mg of the calcined body corresponds to 0.231 mmol. The molecular weight of lithium fluoride (LiF) is 26, and the mass of lithium fluoride (LiF), at which 5 atoms of oxygen are substituted with fluorine, with respect to 0.231 mmol of the calcined body is 5 times of 0.231 mmol, and therefore becomes 26×0.231 mmol×5≅30 mg. Accordingly, the compositional formula representing the solid electrolyte of Comparative Example 2 obtained after main firing is $(Li_{5.5}Ga_{0.5})(La_{2.96}Nd_{0.04})Zr_2O_7F_5$.

1-4-7. Production of Solid Electrolyte Pellet for Evaluation of Comparative Example 3

In Comparative Example 3, a mixed solution was prepared using the above-mentioned raw material solutions so that the value of x becomes 0.5 and the value of y becomes 0.04 in the compositional formula $(Li_{7-3x}Ga_x)(La_{3-y}Nd_y)Zr_2O_{12}$. Specifically, first, in a reagent bottle made of Pyrex equipped with a magnetic stirrer bar, 5.650 g of the 2-butoxyethanol solution of 1 mol/kg lithium nitrate, 0.500 g of the ethanol solution of 1 mol/kg gallium nitrate n-hydrate, 2.960 g of the 2-butoxyethanol solution of 1 mol/kg lanthanum nitrate hexahydrate, 0.040 g of the 2-butoxyethanol solution of 1 mol/kg neodymium nitrate hydrate, and 2.000 g of the butanol solution of 1 mol/kg zirconium tetra-n-butoxide were weighed, and stirring was performed at room temperature for 30 minutes using a magnetic stirrer, whereby a mixed solution was obtained. The mass (g) of the 2-butoxyethanol solution of 1 mol/kg lithium nitrate is set in consideration of the mass of Li in lithium fluoride (LiF) to be added thereafter and the mass of Li to be volatilized during main firing. Specifically, the mass of the 2-butoxyethanol solution of 1 mol/kg lithium nitrate is set to 5.650 g being a value obtained by subtracting 1.500 g that is the mass of Li of lithium fluoride (LiF) to be added thereafter from 7.150 g so that the mass becomes 7.150 g that is 1.3 times the mass corresponding to $Li_{5.5}$ shown in the above compositional formula when x=0.5 at a stage before main firing.

Subsequently, the reagent bottle was placed on a hot plate, and the set temperature of the hot plate was gradually increased to 360° C., and heating was performed at 360° C. for 30 minutes to remove the solvent from the mixed solution, whereby a first mixture was obtained. Thereafter, heating was performed for 1 hour by setting the set temperature of the hot plate to 540° C. to burn and decompose the remaining organic components, followed by gradually cooling to room temperature on the hot plate, whereby a calcined body was obtained. Subsequently, the calcined body was transferred to an agate mortar and sufficiently ground. To 200 mg of the ground calcined body, 9 mg of lithium fluoride (LiF) manufactured by Kojundo Chemical Laboratory Co., Ltd. was added and well mixed together, whereby a second mixture was obtained. The second mixture was placed in a die (molding die) with an exhaust port having an inner diameter of 10 mm and pressed at a pressure of 624 MPa for 5 minutes, whereby a second mixture pellet was prepared. Subsequently, the second mixture pellet was placed in a crucible made of magnesium oxide, and the crucible was covered with a lid made of magnesium oxide, and main firing was performed at 1000° C. for 8 hours in an electric muffle furnace. The electric muffle furnace was gradually cooled to room temperature and the second mixture pellet was taken out, whereby a solid electrolyte pellet for evaluation of Comparative Example 3 having a diameter of about 9.5 mm and a thickness of about 800 µm was produced. In the method for preparing the mixed solution and producing the solid electrolyte pellet for evaluation of Comparative Example 3, the amount of lithium fluoride (LiF) to be added to 200 mg of the calcined body is an amount capable of substituting 1.5 atoms of oxygen with fluorine with respect to Example 1. Specifically, the compositional formula representing the calcined body of Comparative Example 3 is $(Li_{5.5}Ga_{0.5})(La_{2.96}Nd_{0.04})Zr_2O_{12}$. The molecular weight of the calcined body represented by the compositional formula is 865. In that case, 200 mg of the calcined body corresponds to 0.231 mmol. The molecular weight of lithium fluoride (LiF) is 26, and the mass of lithium fluoride (LiF), at which 1.5 atoms of oxygen are substituted with fluorine, with respect to 0.231 mmol of the calcined body is 1.5 times of 0.231 mmol, and therefore becomes 26×0.231 mmol×1.5≅9 mg. Accordingly, the compositional formula representing the solid electrolyte of Comparative Example 3 obtained after main firing is $(Li_{5.5}Ga_{0.5})(La_{2.96}Nd_{0.04})Zr_2O_{10.5}F_{1.5}$.

Figure 8:
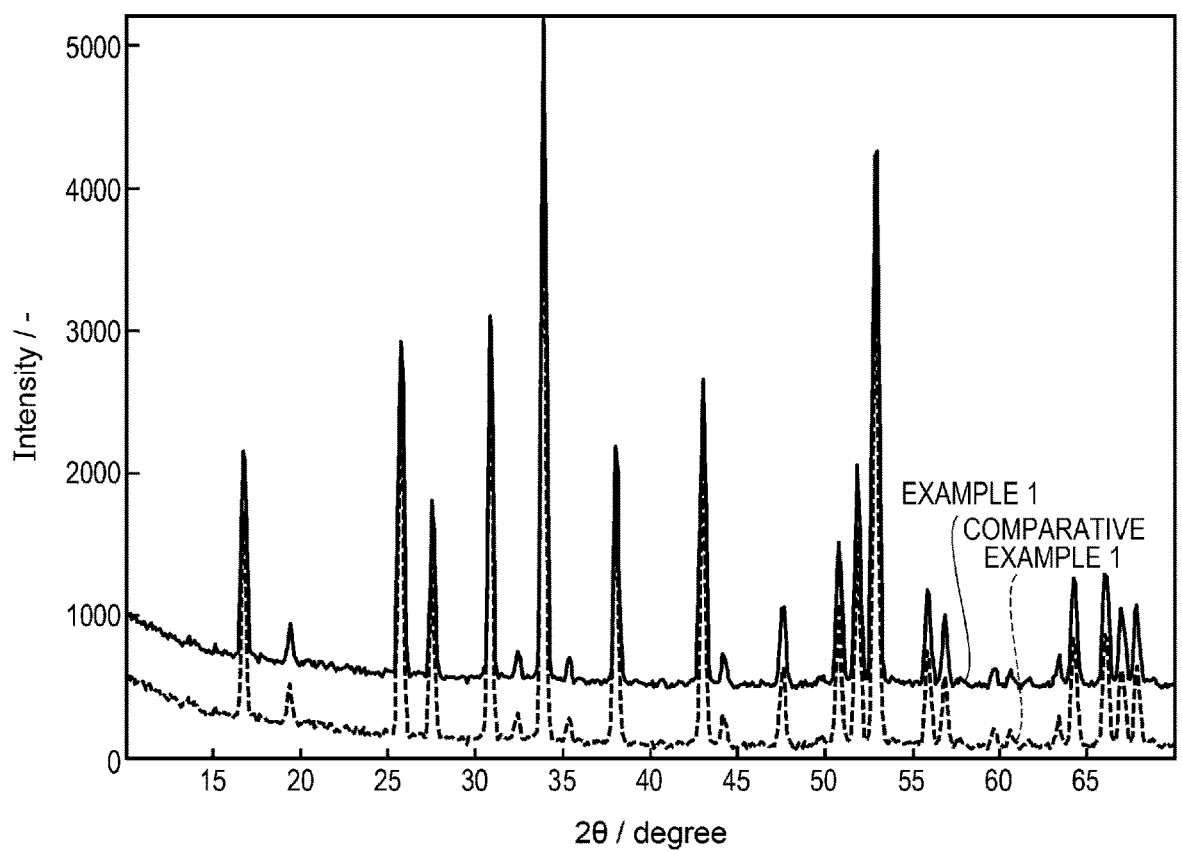
FIG. 8 is a view showing X-ray diffraction analysis (XRD) charts of solid electrolyte pellets of Example 1 and Comparative Example 1.
Figure 9:
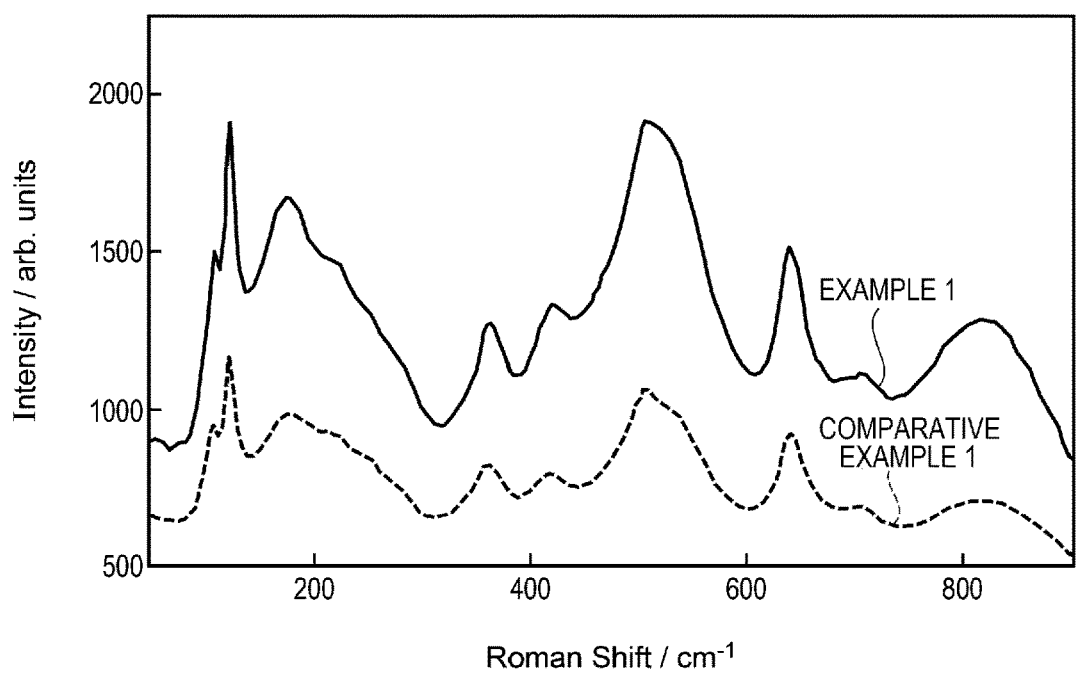
FIG. 9 is a view showing Raman scattering spectra by Raman spectroscopy of the solid electrolyte pellets of Example 1 and Comparative Example 1.
Figure 10:
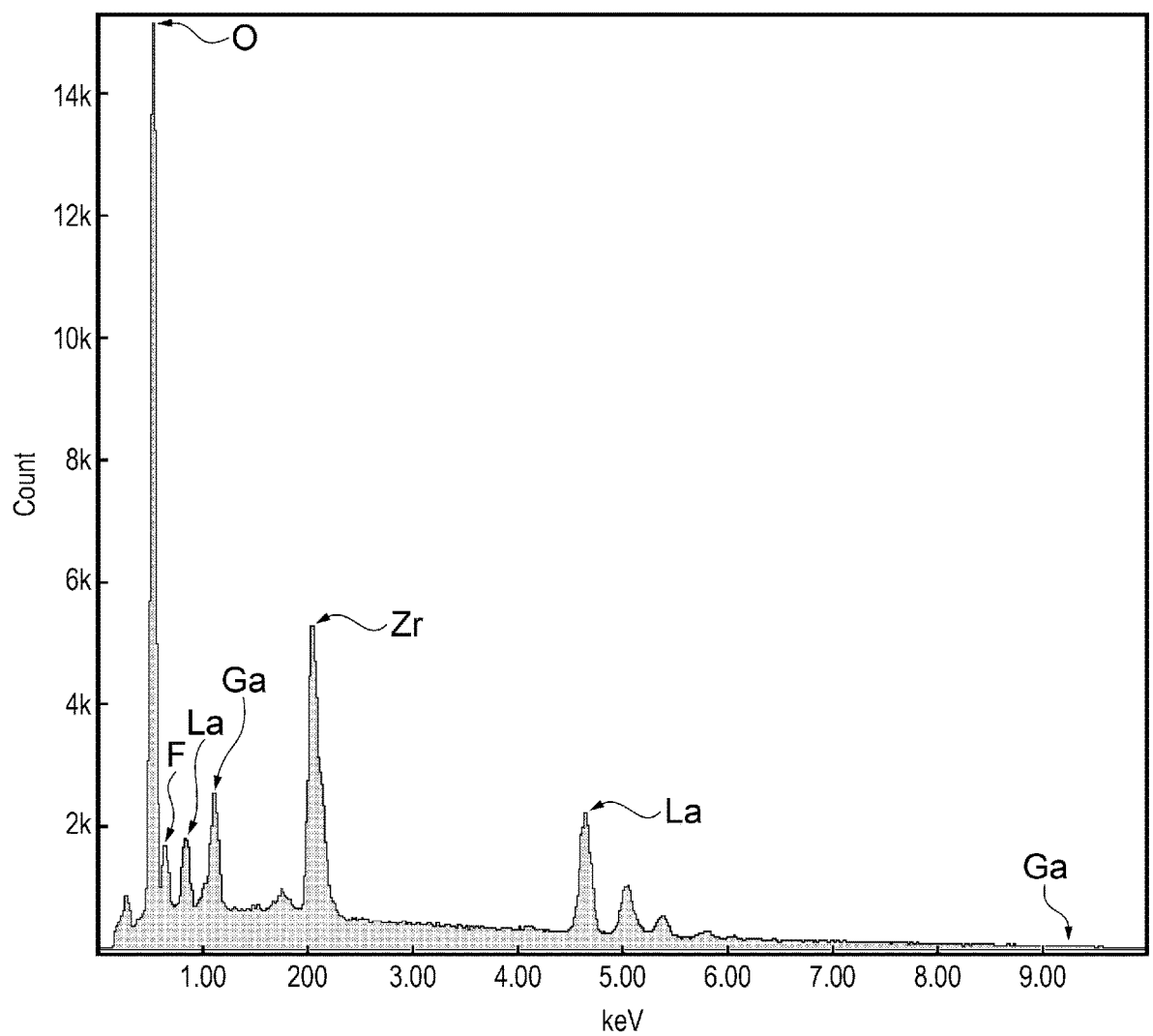
FIG. 10 is a view showing a result of observation using a scanning electron microscope (SEM-EDS) of the solid electrolyte pellet of Example 1.

1-5. Evaluation of Solid Electrolyte Pellets of Examples and Comparative Examples Next, results of evaluating the solid electrolyte pellets of Examples 1 to 4 and Comparative Examples 1 to 3 will be described with reference to FIGS. 8 to 10 and Table 1. FIG. 8 is a view showing X-ray diffraction analysis (XRD) charts of the solid electrolyte pellets of Example 1 and Comparative Example 1, FIG. 9 is a view showing Raman scattering spectra by Raman spectroscopy of the solid electrolyte pellets of Example 1 and Comparative Example 1, and FIG. 10 is a view showing a result of observation using a scanning electron microscope (SEM-EDS) of the solid electrolyte pellet of Example 1. Table 1 is a table showing lithium ion conductivities of the solid electrolyte pellets of Examples 1 to 4 and Comparative Examples 1 to 3.

By production of impurities in the solid electrolyte pellets of Example 1 and Comparative Example 1 was examined using an X-ray diffractometer MRD (Philips Ltd.). According to the XRD charts shown in FIG. 8, diffraction peaks of only a target material having a garnet-type crystal structure with no impurities were detected in both the solid electrolytes of Example 1 and Comparative Example 1.

Further, Raman scattering spectra were obtained using a Raman spectrometer S-2000 (JEOL Ltd.), and the crystal structures of the solid electrolyte pellets of Example 1 and Comparative Example 1 were confirmed. According to the Raman scattering spectra shown in FIG. 9, it is considered that both the solid electrolytes of Example 1 and Comparative Example 1 have a cubic crystal system.

Further, with respect to Examples, SEM-EDS analysis was performed. Specifically, the SEM-EDS analysis was performed using a scanning electron microscope with EBSP, X30SFEG/EBSP (FEI Company Japan Ltd.), and the fluorinated state was confirmed. As the X-ray, a Mg—Kα beam (soft X-ray) is used, and the wavelength (α) is set as follows: α=9.8900 Å. As shown in FIG. 10, the existence of F other than Ga, La, Zr, and O that are the constituent elements was confirmed in the solid electrolyte of Example 1. Further, it was confirmed that 1 atom or less of oxygen is substituted with fluorine based on the ratio of the number of counts of gallium, lanthanum, zirconium, and oxygen that are the other elements to the number of counts of fluorine.

The XRD charts and Raman scattering spectra of the other solid electrolytes of Examples 2 to 4 are also the same as those of Example 1, and the solid electrolytes of Examples 2 to 4 also have a cubic garnet-type crystal structure with no impurities.

Subsequently, on both front and rear faces of the solid electrolyte pellets of Examples 1 to 4 and Comparative Examples 1 to 3, an ion activating electrode with a diameter of 8 mm was formed by sputtering metallic Li. Subsequently, by using an impedance analyzer SI 1260 (Solartron, Inc.), the AC impedance between the front and rear ion activating electrodes was measured. From the measurement results of the AC impedance, a bulk lithium ion conductivity and a grain boundary lithium ion conductivity of each of the solid electrolyte pellets were determined, and also the total lithium ion conductivity including the bulk and grain boundary lithium ion conductivities was determined. The results are shown in the following Table 1.

TABLE 1

| | Compositional formula of solid electrolyte | Lithium ion conductivity (S/cm) | | | Mixing amount (mg) | |
| --- | --- | --- | --- | --- | --- | --- |
| | | Bulk | Grain boundary | Total | Calcined body | LiF |
| Example 1 | $(Li_{5.5}Ga_{0.5})(La_{2.96}Nd_{0.04})Zr_2O_{11}F_1$ | $6.1 \times 10^{-3}$ | $1.9 \times 10^{-3}$ | $1.5 \times 10^{-3}$ | 200 | 6 |
| Example 2 | $(Li_{5.5}Ga_{0.5})(La_{2.96}Nd_{0.04})Zr_2O_{11}F_1$ | $6.1 \times 10^{-3}$ | $1.9 \times 10^{-3}$ | $1.5 \times 10^{-3}$ | — | — |
| Example 3 | $(Li_{5.55}Ga_{0.5})(La_{2.95}Ca_{0.05})Zr_2O_{11}F_1$ | $6.1 \times 10^{-3}$ | $9.5 \times 10^{-4}$ | $8.2 \times 10^{-4}$ | 200 | 6 |
| Example 4 | $(Li_{5.55}Ga_{0.5})(La_{2.95}Ca_{0.05})Zr_2O_{11}F_1$ | $6.1 \times 10^{-3}$ | $9.5 \times 10^{-4}$ | $8.2 \times 10^{-4}$ | — | — |

TABLE 1-continued

| | Compositional formula of solid electrolyte | Lithium ion conductivity (S/cm) | | | Mixing amount (mg) | |
|---|---|---|---|---|---|---|
| | | Bulk | Grain boundary | Total | Calcined body | LiF |
| Comparative Example 1 | $(Li_{5.5}Ga_{0.5})(La_{2.96}Nd_{0.04})Zr_2O_{12}$ | $5.5 \times 10^{-3}$ | $5.1 \times 10^{-3}$ | $4.6 \times 10^{-4}$ | 200 | 0 |
| Comparative Example 2 | $(Li_{5.5}Ga_{0.5})(La_{2.96}Nd_{0.04})Zr_2O_7F_5$ | — | — | $2.7 \times 10^{-6}$ | 200 | 30 |
| Comparative Example 3 | $(Li_{5.5}Ga_{0.5})(La_{2.96}Nd_{0.04})Zr_2O_{10.5}F_{1.5}$ | — | — | $5.0 \times 10^{-6}$ | 200 | 9 |

As shown in Table 1, in Example 1 and Example 2, the bulk lithium ion conductivity was $6.1 \times 10^{-3}$ S (siemens)/cm (centimeter), the grain boundary lithium ion conductivity was $1.9 \times 10^{-3}$ S/cm, and the total lithium ion conductivity was $1.5 \times 10^{-3}$ S/cm. That is, there was no difference due to the difference in the method for producing a solid electrolyte between Example 1 and Example 2. On the other hand, in comparative Example 1 in which fluorine is not introduced, the bulk lithium ion conductivity was $5.5 \times 10^{-3}$ S (siemens)/cm (centimeter), the grain boundary lithium ion conductivity was $5.1 \times 10^{-3}$ S/cm, and the total lithium ion conductivity was $4.6 \times 10^{-4}$ S/cm. That is, although there was not so much difference in the bulk lithium ion conductivity, the grain boundary lithium ion conductivity was improved, and the total lithium ion conductivity was enhanced in the solid electrolytes of Example 1 and Example 2 as compared with those of Comparative Example 1. This is considered to be because insertion and extraction of lithium ions in the solid electrolyte became smooth by introducing fluorine.

In Comparative Example 2, 5 atoms of oxygen are substituted with fluorine by increasing the introduction amount of fluorine with respect to Example 1. Further, in Comparative Example 3, 1.5 atoms of oxygen are substituted with fluorine by increasing the introduction amount of fluorine. In the measurement of the lithium ion conductivity in Comparative Example 2 and Comparative Example 3, the bulk and the grain boundary could not be separated. This is considered to be because the grain boundary resistance is decreased, but on the other hand, the total lithium ion conductivity was further decreased as compared with that of Example 1 or Comparative Example 1. This is considered to be because in the garnet-type crystal structure, by introducing fluorine in a larger amount into a lithium ion conduction pathway, the lithium ion conductivity is decreased. In other words, it is considered that in the garnet-type crystal structure, insertion and extraction of lithium ions in the solid electrolyte become smoother by substituting 1 atom or less of oxygen with fluorine.

In Example 3 and Example 4 in which Ca was used as an element with which La is partially substituted, the bulk lithium ion conductivity was $6.1 \times 10^{-3}$ S (siemens)/cm (centimeter), the grain boundary lithium ion conductivity was $9.5 \times 10^{-4}$ S/cm, and the total lithium ion conductivity was $8.2 \times 10^{-4}$ S/cm. In Example 3 and Example 4, the grain boundary lithium ion conductivity and the total lithium ion conductivity are slightly decreased as compared with those of Example 1 and Example 2 in which Nd was used as an element with which La is partially substituted, but the total lithium ion conductivity shows a higher value than that of Comparative Example 1 in which fluorine is not introduced.

With respect to the introduction amount of fluorine, it is considered that one atom or less of oxygen is preferably substituted with fluorine similarly in a garnet-type solid electrolyte represented by the compositional formula (2): $(Li_{7-3x+y}Ga_x)(La_{3-y}Ca_y)Zr_2O_{12-z}F_z$ in which Ca is used as an element with which La is partially substituted. That is, it is preferred to satisfy $0.1 \leq x \leq 1.0$, $0 < y \leq 0.2$, and $0 < z \leq 1.0$ in the compositional formula (1) or (2) representing the garnet-type solid electrolyte conducting lithium.

2. Second Embodiment

2-1. Electronic Apparatus

Figure 11:
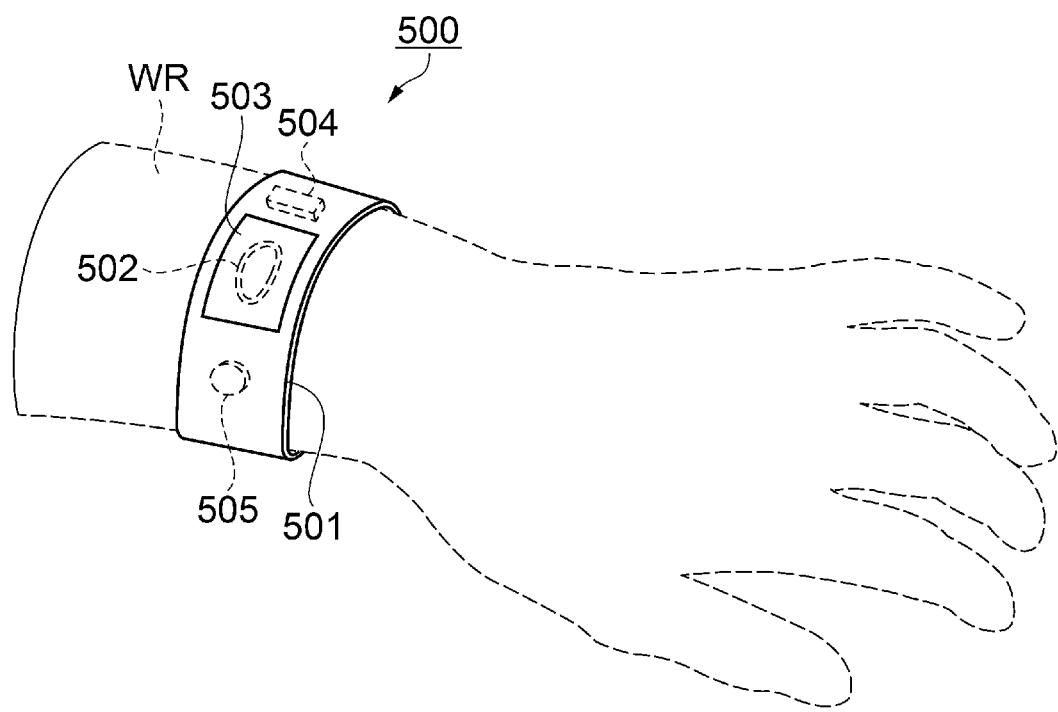
FIG. 11 is a perspective view showing a configuration of a wearable apparatus as an electronic apparatus of a second embodiment.

Next, an electronic apparatus of this embodiment will be described by showing a wearable apparatus as an example. FIG. 11 is a perspective view showing a configuration of a wearable apparatus as an electronic apparatus of a second embodiment.

As shown in FIG. 11, a wearable apparatus 500 as the electronic apparatus of this embodiment is an information apparatus that is worn on, for example, the wrist WR of a human body like a watch and that can obtain information regarding the human body, and includes a band 501, a sensor 502, a display portion 503, a processing portion 504, and a battery 505.

The band 501 is formed in a belt shape using, for example, a resin having flexibility such as rubber so as to come into close contact with the wrist WR when it is worn, and has a binding portion capable of adjusting the binding position in an end portion of the band.

The sensor 502 is, for example, an optical sensor, and is disposed at an inner side of the band 501 so as to come into contact with the wrist WR when it is worn.

The display portion 503 is, for example, a light-receiving type liquid crystal display device, and is disposed at an outer face side of the band 501 at a side opposite to the inner face to which the sensor 502 is attached so that a wearer can read the information displayed in the display portion 503.

The processing portion 504 is, for example, an integrated circuit (IC), and is incorporated in the band 501 and is electrically coupled to the sensor 502 and the display portion 503. The processing portion 504 performs arithmetic processing for measuring the pulse rate, the blood glucose level, or the like based on the output from the sensor 502. In addition, the processing portion 504 controls the display portion 503 so as to display the measurement results or the like.

The battery 505 is incorporated in the band 501 as a power supply source supplying power to the sensor 502, the display portion 503, the processing portion 504, etc. As the battery 505, the lithium battery 100 of the above-mentioned first embodiment is used.

According to the wearable apparatus 500 of this embodiment, by the sensor 502, information regarding the pulse rate or the blood glucose level of a wearer, or the like is electrically detected from the wrist WR, and the pulse rate, the blood glucose level, or the like can be displayed in the display portion 503 through the arithmetic processing or the like by the processing portion 504. In the display portion 503, not only the measurement results, but also, for example, information indicating the conditions of the human body predicted from the measurement results, time, etc. can be displayed.

Since the lithium battery 100 that is small but has excellent charge-discharge characteristics is used as the battery 505, the wearable apparatus 500 that is lightweight and thin and can also withstand long-term repeated use can be provided.

In this embodiment, the wearable apparatus 500 of a watch type is illustrated, however, the wearable apparatus 500 may be a wearable apparatus to be worn on, for example, the ankle, head, ear, waist, or the like.

The electronic apparatus to which the lithium battery 100 of this embodiment is applied as a power supply source is not limited to the wearable apparatus 500. Examples thereof include a head-mounted display, a head-up display, a portable telephone, a portable information terminal, a notebook personal computer, a digital camera, a video camera, a music player, a wireless headphone, and a gaming machine. Further, the lithium battery 100 can be applied not only to apparatuses for general consumers, but also to apparatuses for industrial use.

In addition, the electronic apparatus including a secondary battery using the solid electrolyte of this embodiment may be a moving object such as an automobile or a ship. For example, the lithium battery as a secondary battery using the solid electrolyte of this embodiment can be favorably adopted as a storage battery for an electric vehicle (EV), a plugin hybrid electric vehicle (PHEV), a hybrid electric vehicle (HEV), a fuel cell vehicle (FCV), or the like. In this case, the storage battery for a moving object is a power supply for driving a motor, and therefore needs to have a large electric capacity and is required to enable quick charging and discharging, and thus, it is preferred to increase the volume ratio of the solid electrolyte 12 by limiting the volume ratio of the positive electrode active materials 11p in the positive electrode composite material 10 to 40%.

The present disclosure is not limited to the above-mentioned embodiments, and various changes, improvements, etc. can be added to the above-mentioned embodiments. Hereinafter, a modification will be described.

Modification

Figure 12:
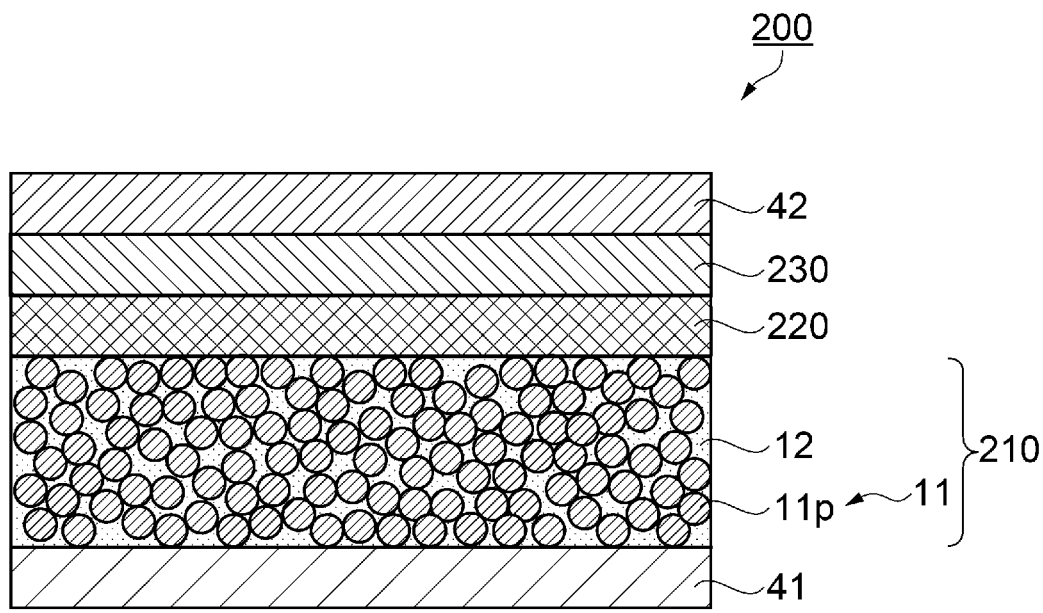
FIG. 12 is a schematic cross-sectional view showing a structure of a lithium battery as a secondary battery of a modification.

The secondary battery to which the solid electrolyte 12 of this embodiment is applied is not limited to the lithium battery 100 that is an all-solid-state secondary battery. FIG. 12 is a schematic cross-sectional view showing a structure of a lithium battery as a secondary battery of a modification. As shown in FIG. 12, a lithium battery 200 of a modification includes a positive electrode composite material 210, a separator 220, and a negative electrode 230 sandwiched between a pair of current collectors 41 and 42. The positive electrode composite material 210 is configured to include an active material portion 11 composed of particulate positive electrode active materials 11p and a solid electrolyte 12 provided in voids in the active material portion 11. The negative electrode 230 is, for example, metallic lithium having a thickness of 100 μm. The separator 220 provided between the positive electrode composite material 210 and the negative electrode 230 is porous, and an electrolyte solution is impregnated thereinto. As such a porous separator 220, a non-woven cloth, a porous resin film, or the like is exemplified, and for example, a porous polypropylene film (Celgard #2500 (registered trademark) manufactured by Asahi Kasei Corporation) having a thickness of 15 μm can be used. Further, the electrolyte solution is a solution obtained by dissolving a compound containing lithium that is an active material in a non-aqueous solvent, and for example, a solution in which lithium hexafluorophosphate ($LiPF_6$) is dissolved at a concentration of 1 mol/L (liter) in a mixed solvent of ethylene carbonate and diethyl carbonate at a volume ratio of 1:1 can be used.

According to the lithium battery 200 of such a modification, the separator 220 impregnated with the electrolyte solution is provided between the positive electrode composite material 210 and the negative electrode 230, and therefore, an interface where lithium ions or electrons conduct can be sufficiently ensured between the positive electrode composite material 210 and the negative electrode 230. That is, the lithium battery 200 having a high energy density and also having a smaller internal resistance can be provided.

Hereinafter, contents derived from the embodiments will be described.

The solid electrolyte of the present application is a garnet-type solid electrolyte that is represented by the following compositional formula (1) or (2) and that conducts lithium.

$$(Li_{7-3x}Ga_x)(La_{3-y}Nd_y)Zr_2O_{12-z}F_z \quad (1)$$

$$(Li_{7-3x+y}Ga_x)(La_{3-y}Ca_y)Zr_2O_{12-z}F_z \quad (2)$$

In the formulae, $0.1 \le x \le 1.0$, $0 < y \le 0.2$, and $0 < z \le 1.0$.

According to the configuration of the present application, the garnet-type solid electrolyte represented by the above compositional formula (1) or (2) has a crystal structure in which lithium (Li) is partially substituted with gallium (Ga), lanthanum (La) is partially substituted with neodymium (Nd) or calcium (Ca), and oxygen (O) is partially substituted with fluorine (F). Accordingly, a solid electrolyte having an improved electrochemical property can be provided.

Specifically, by partially substituting lithium with gallium, a solid electrolyte having an improved bulk lithium ion conductivity can be realized. When lithium is partially substituted with gallium, coarse particles are likely to be formed after firing in a process for forming a solid electrolyte, however, by partially substituting lanthanum with neodymium or calcium, the formation of coarse particles is suppressed, and the grain boundary resistance is decreased. In addition, by partially substituting oxygen with fluorine, insertion and extraction of lithium ions in the solid electrolyte become smooth, and the electrochemical property is improved. Further, by partially substituting oxygen with fluorine, the oxidation state of lanthanum and zirconium that are transition metals are thermochemically stabilized.

The method for producing a solid electrolyte of the present application is a method for producing a garnet-type solid electrolyte that is represented by the following compositional formula (1) or (2) and that conducts lithium, and includes forming a first mixture by mixing raw material solutions containing elements shown in the compositional formula (1) or (2), forming a calcined body by subjecting the first mixture to a first heating treatment, forming a second mixture by mixing the calcined body with lithium fluoride, and performing main firing by subjecting the second mixture to a second heating treatment, wherein a mixing amount of the lithium fluoride is an amount configured to substitute 1 atom or less of oxygen with fluorine.

$$(Li_{7-3x}Ga_x)(La_{3-y}Nd_y)Zr_2O_{12-z}F_z \quad (1)$$

$$(Li_{7-3x+y}Ga_x)(La_{3-y}Ca_y)Zr_2O_{12-x}F \quad (2)$$

In the formulae, $0.1 \leq x \leq 1.0$, $0 < y \leq 0.2$, and $0 < z \leq 1.0$.

According to the method for producing a solid electrolyte of the present application, a solid electrolyte that has a crystal structure in which lithium (Li) is partially substituted with gallium (Ga), lanthanum (La) is partially substituted with neodymium (Nd) or calcium (Ca), and oxygen (O) is partially substituted with fluorine (F), and that has an improved electrochemical property can be produced. Further, main firing is performed after the second mixture is formed by adding lithium fluoride to the calcined body formed by a liquid phase method. The mixing amount of lithium fluoride is an amount capable of substituting 1 atom or less of oxygen with fluorine, and therefore, by limiting the mixing amount of lithium fluoride, it becomes difficult to generate a byproduct during main firing. That is, a decrease in the lithium ion conductivity of the solid electrolyte by a byproduct can be suppressed.

The another method for producing a solid electrolyte of the present application is a method for producing a garnet-type solid electrolyte that is represented by the following compositional formula (1) or (2) and that conducts lithium, and includes forming a mixture by mixing raw material solutions containing elements shown in the compositional formula (1) or (2) with a lithium fluoride, forming a calcined body by subjecting the mixture to a first heating treatment, and performing main firing by subjecting the calcined body to a second heating treatment, wherein a mixing amount of the lithium fluoride is an amount configured to substitute 1 atom or less of oxygen with fluorine.

$$(Li_{7-3x}Ga_x)(La_{3-y}Nd_y)Zr_2O_{12-z}F_z \quad (1)$$

$$(Li_{7-3x+y}Ga_x)(La_{3-y}Ca_y)Zr_2O_{12-x}F \quad (2)$$

In the formulae, $0.1 \leq x \leq 1.0$, $0 < y \leq 0.2$, and $0 < z \leq 1.0$.

According to the another method for producing a solid electrolyte of the present application, a solid electrolyte that has a crystal structure in which lithium (Li) is partially substituted with gallium (Ga), lanthanum (La) is partially substituted with neodymium (Nd) or calcium (Ca), and oxygen (O) is partially substituted with fluorine (F), and that has an improved electrochemical property can be produced. Further, the calcined body of the mixture obtained by mixing the raw material solutions with lithium fluoride by a liquid phase method is subjected to main firing, and therefore, the production process can be simplified as compared with a case where main firing is performed after the calcined body obtained using the raw material solutions is mixed with lithium fluoride. Further, the mixing amount of lithium fluoride is an amount capable of substituting 1 atom or less of oxygen with fluorine, and therefore, by limiting the mixing amount of lithium fluoride, it becomes difficult to generate a byproduct during main firing.

In the method for producing a solid electrolyte described above, a temperature in the first heating treatment may be 500° C. or higher and 650° C. or lower, and a temperature in the second heating treatment may be 800° C. or higher and 1000° C. or lower.

According to this method, the solvent contained in the raw material solutions is removed by the first heating treatment, and a solid electrolyte sintered by the second heating treatment while suppressing volatilization of lithium can be obtained.

The secondary battery of the present application includes a positive electrode composite material containing the solid electrolyte described above and a positive electrode active material containing lithium, an electrode provided at one face of the positive electrode composite material, and a current collector provided at another face of the positive electrode composite material.

According to the configuration of the present application, the positive electrode composite material contains the solid electrolyte having an improved electrochemical property and the positive electrode active material, and therefore, a secondary battery having excellent charge-discharge characteristics can be provided.

In the secondary battery described above, the positive electrode active material may be a lithium composite metal oxide.

According to this configuration, a secondary battery that has excellent charge-discharge characteristics and is thermally stable can be provided.

In the secondary battery described above, the electrode may be metallic lithium.

According to this configuration, a secondary battery having excellent charge-discharge characteristics and also having a large battery capacity per unit volume can be provided.

An electronic apparatus of the present application includes the secondary battery described above.

According to the configuration of the present application, the secondary battery having excellent charge-discharge characteristics is included, and therefore, an electronic apparatus that can withstand repeated charging and discharging and can be used over a long period of time can be provided.

What is claimed is:

1. A garnet-type solid electrolyte that is represented by the following compositional formula (1) or (2) and that conducts lithium:

$$(Li_{7-3x}Ga_x)(La_{3-y}Nd_y)Zr_2O_{12-z}F_z \quad (1)$$

$$(Li_{7-3x+y}Ga_x)(La_{3-y}Ca_y)Zr_2O_{12-z}F_z \quad (2)$$

provided that $0.1 \leq x \leq 1.0$, $0 < y \leq 0.2$, and $0 < z \leq 1.0$.

2. A method for producing a solid electrolyte being a method for producing a garnet-type solid electrolyte that is represented by the following compositional formula (1) or (2) and that conducts lithium, the method comprising:

forming a first mixture by mixing raw material solutions containing elements shown in the compositional formula (1) or (2);

forming a calcined body by subjecting the first mixture to a first heating treatment;

forming a second mixture by mixing the calcined body with lithium fluoride; and performing main firing by subjecting the second mixture to a second heating treatment, wherein a mixing amount of the lithium fluoride is an amount configured to substitute 1 atom or less of oxygen with fluorine:

$$(Li_{7-3x}Ga_x)(La_{3-y}Nd_y)Zr_2O_{12-z}F_z \quad (1)$$

$$(Li_{7-3x+y}Ga_x)(La_{3-y}Ca_y)Zr_2O_{12-z}F_z \quad (2)$$

provided that $0.1 \leq x \leq 1.0$, $0 < y \leq 0.2$, and $0 < z \leq 1.0$.

3. A method for producing a solid electrolyte being a method for producing a garnet-type solid electrolyte that is represented by the following compositional formula (1) or (2) and that conducts lithium, the method comprising:

forming a mixture by mixing raw material solutions containing elements shown in the compositional formula (1) or (2) with lithium fluoride;

forming a calcined body by subjecting the mixture to a first heating treatment; and performing main firing by subjecting the calcined body to a second heating treatment, wherein a mixing amount of the lithium fluoride is an amount configured to substitute 1 atom or less of oxygen with fluorine:

$$(Li_{7-3x}Ga_x)(La_{3-y}Nd_y)Zr_2O_{12-z}F_z \quad (1)$$

$$(Li_{7-3x+y}Ga_x)(La_{3-y}Ca_y)Zr_2O_{12-z}F_z \quad (2)$$

provided that $0.1 \leq x \leq 1.0$, $0 < y \leq 0.2$, and $0 < z \leq 1.0$.

4. The method for producing a solid electrolyte according to claim 3, wherein a temperature in the first heating treatment is 500° C. or higher and 650° C. or lower, and a temperature in the second heating treatment is 800° C. or higher and 1000° C. or lower.

5. A secondary battery, comprising:

a positive electrode composite material containing the solid electrolyte according to claim 1 and a positive electrode active material containing lithium;

an electrode provided at one face of the positive electrode composite material; and a current collector provided at another face of the positive electrode composite material.

6. The secondary battery according to claim 5, wherein the positive electrode active material is a lithium composite metal oxide.

7. The secondary battery according to claim 5, wherein the electrode is metallic lithium.

8. An electronic apparatus, comprising the secondary battery according to claim 5.

* * * * *